US012741428B2

(12) United States Patent
Puhurcuoğlu et al.

(10) Patent No.: US 12,741,428 B2
(45) Date of Patent: Sep. 22, 2026

(54) DIGITAL THREE DIMENSIONAL (3D) MEASUREMENT OF BONDLINE THICKNESS AND WIDTH DURING BLADE ASSEMBLY

(71) Applicant: TPI Technology, Inc., Scottsdale, AZ (US)

(72) Inventors: Nihal Puhurcuoğlu, Izmir (TR); Nima Pedramasl, Izmir (TR); Berkay Aydoğan, Izmir (TR); Ilker Topuz, Izmir (TR)

(73) Assignee: TPI Technology, Inc., Scottsdale, AZ (US)

( * ) Notice: Subject to any disclaimer, the term of this patent is extended or adjusted under 35 U.S.C. 154(b) by 107 days.

(21) Appl. No.: 18/950,448

(22) Filed: Nov. 18, 2024

(65) Prior Publication Data

US 2025/0162263 A1 May 22, 2025

Related U.S. Application Data

(60) Provisional application No. 63/600,367, filed on Nov. 17, 2023.

(51) Int. Cl.
*B29C 65/82* (2006.01)
*B29C 65/48* (2006.01)
*B29L 31/08* (2006.01)

(52) U.S. Cl.
CPC .......... *B29C 65/8253* (2013.01); *B29C 65/48* (2013.01); *B29L 2031/085* (2013.01)

(58) Field of Classification Search
CPC ... B29C 65/8253; B29C 65/48; B29C 66/131; B29C 66/543; B29C 66/545;
(Continued)

(56) References Cited

U.S. PATENT DOCUMENTS 7,278,315 B1 * 10/2007 Klein .................. G01N 29/221 73/598
2011/0318562 A1 * 12/2011 Dry ........................ C04B 28/02 428/221

(Continued)

FOREIGN PATENT DOCUMENTS

CN 115143919 A 10/2022
WO WO-2012037219 A1 * 3/2012 .............. C08J 5/244
(Continued)

OTHER PUBLICATIONS

International Search Report and Written Opinion for International Application No. PCT/US24/56355 dated Jan. 17, 2025.

*Primary Examiner* — Tarifur R Chowdhury
*Assistant Examiner* — Kemaya Nguyen
(74) *Attorney, Agent, or Firm* — Stephen J. Kenny; Nicolerantz A. Bustos-Pomerantz; Foley Hoag LLP

(57) ABSTRACT

A method for measuring bondline thickness of a wind turbine blade including scanning a first blade shell in a first mold half, the first mold half having a mold flange and a mold knob, forming a first scan; scanning a second blade shell in a second mold half, the second mold half having a mold flange and a mold knob, forming a second scan; scanning the at least one shear web exterior to the mold, forming a third scan; bonding the at least one shear web to the first blade shell; scanning the bonded at least one shear web and the first blade shell, forming a fourth scan; closing the first mold half onto the second mold half to form a closed mold; scanning the mold flanges and the mold knobs of the closed mold, forming a fifth scan; aligning the first, second, third, fourth and fifth scans; and measuring at least one bondline of the aligned scans.

12 Claims, 28 Drawing Sheets

(58) Field of Classification Search
CPC .......... B29C 66/73941; B29C 66/8322; B29C 66/847; B29C 66/9672; B29L 2031/085
See application file for complete search history.

(56) References Cited

U.S. PATENT DOCUMENTS

| | | | | |
|---|---|---|---|---|
| 2018/0106765 | A1 * | 4/2018 | Kim | G01N 29/043 |
| 2020/0125846 | A1 | 4/2020 | Laughlin et al. | |
| 2025/0162263 | A1 * | 5/2025 | Puhurcuoglu | B29C 66/9672 |

FOREIGN PATENT DOCUMENTS

| | | | | |
|---|---|---|---|---|
| WO | WO-2015156664 | A1 * | 10/2015 | F16L 23/04 |
| WO | WO-2023/194150 | A1 | 10/2023 | |

* cited by examiner

| | Part |
|---|---|
| 2502 | Web & gantry profiles |
| 2504 | SS |
| 2506 | PS |
| 2508 | Closure profiles |

DIGITAL THREE DIMENSIONAL (3D) MEASUREMENT OF BONDLINE THICKNESS AND WIDTH DURING BLADE ASSEMBLY

CROSS REFERENCE TO RELATED APPLICATION

This application claims the benefit of priority under 35 USC 119 to U.S. Provisional Application No. 63/600,367 filed Nov. 17, 2023, the entire contents of which are hereby incorporated by reference.

BACKGROUND OF THE DISCLOSED SUBJECT MATTER

Field of the Disclosed Subject Matter

The disclosed subject matter relates to measurement of bondline thickness and width during wind turbine blade assembly. Particularly, the present disclosed subject matter is directed to digital 3D measurements of bondline thickness and width during wind turbine blade assembly using a 3D laser scanner, and accurately determine the gaps (or spaces) between wind turbine blade components where a bonding paste is to be applied.

Description of Related Art

Wind turbine blades are a critical component in the generation of renewable energy from wind power. To ensure maximum efficiency and longevity of the wind turbine, these blades must be of high quality. One of the essential factors that contribute to the quality of the manufactured blade is the accuracy of the bondline paste thickness and width. The bondline paste plays a crucial role in attaching different parts of the blade, and its precise application is essential for the blade's structural integrity. Accurate measurement and application of the bondline paste ensure that the prefabs and shell are perfectly aligned and balanced, which is necessary for optimal performance. Any deviation in the bondline thickness and width can cause quality issues, leading to reduced energy output or even premature failure of the blade. Therefore, it is crucial to use advanced manufacturing techniques and device to measure and apply the bondline paste accurately, ensuring high-quality wind turbine blades that meet the industry's standards and requirements.

Traditional wetcast is usually a time-consuming process. However, digital wetcast tremendously decreases the process time. Traditionally, bonding paste was wasted and the accuracy of the measurement is highly dependent on handling style of operator. The perpendicularity and parallelism of jaw parts of caliper to thickness of bonding paste to be measured, play a crucial role in reliability of measurement. Additionally, current techniques are susceptible to the location of the bonding paste to be measured might be deviated from the location which is specified in the customer specification. There is no room for mistake in 3D digital measurement of bonding paste gap which on contrary happens more frequently in traditional manual measurement which is prone to human error (wrong reading the result written on the caliper).

Therefore, there is a need for measurement of bondline thickness and width during blade assembly.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method for measuring bondline thickness of a wind turbine blade, the method including scanning a first blade shell in a first mold half, the first mold half having a mold flange and a mold knob, forming a first scan, scanning a second blade shell in a second mold half, the second mold half having a mold flange and a mold knob, forming a second scan, scanning the at least one shear web exterior to the mold, forming a third scan, bonding the at least one shear web to the first blade shell, scanning the bonded at least one shear web and the first blade shell, forming a fourth scan, closing the first mold half onto the second mold half to form a closed mold, scanning the mold flanges and the mold knobs of the closed mold, forming a fifth scan, aligning the first, second, third, fourth and fifth scans and measuring at least one bondline of the aligned scans.

In some embodiments, the bondline is formed between the at least one shear web and the second blade shell.

In some embodiments, the bondline is formed between the first blade shell, the second blade shell, and a leading edge bond cap.

In some embodiments, the bondline is formed between the first blade shell, the second blade shell, and a trailing edge bond cap.

In some embodiments, scanning the at least one shear web exterior to the mold comprises scanning a main body, a first flange and a second flange of the at least one shear web.

In some embodiments, the method further includes uniformly placing at least one retroreflective target on at least one of the first blade shell and the second blade shell, scanning the at least one retroreflective target and locating the at least one retroreflective target in a computer environment.

In some embodiments, aligning the scans comprises selecting at least one point shared between the scans and minimizing the deviation between the at least one point between the scans.

In some embodiments, aligning the scans comprises adjusting an axis of a scan relative to a global axis of the computer environment.

In some embodiments, aligning the scans comprises aligning the scan of the at least one shear web with the scan of the bonded at least one shear web and the first blade shell.

In some embodiments, aligning the scans comprises aligning the scan of the first blade shell and the second blade shell by contacting the corresponding mold knobs and mold flanges.

In some embodiments, the at least one shear web comprises a main shear web and a trailing shear web.

In some embodiments, forming the first, second, third, fourth and fifth scan comprises transmitting scanned data to a three-dimensional (3D) computer environment.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1:
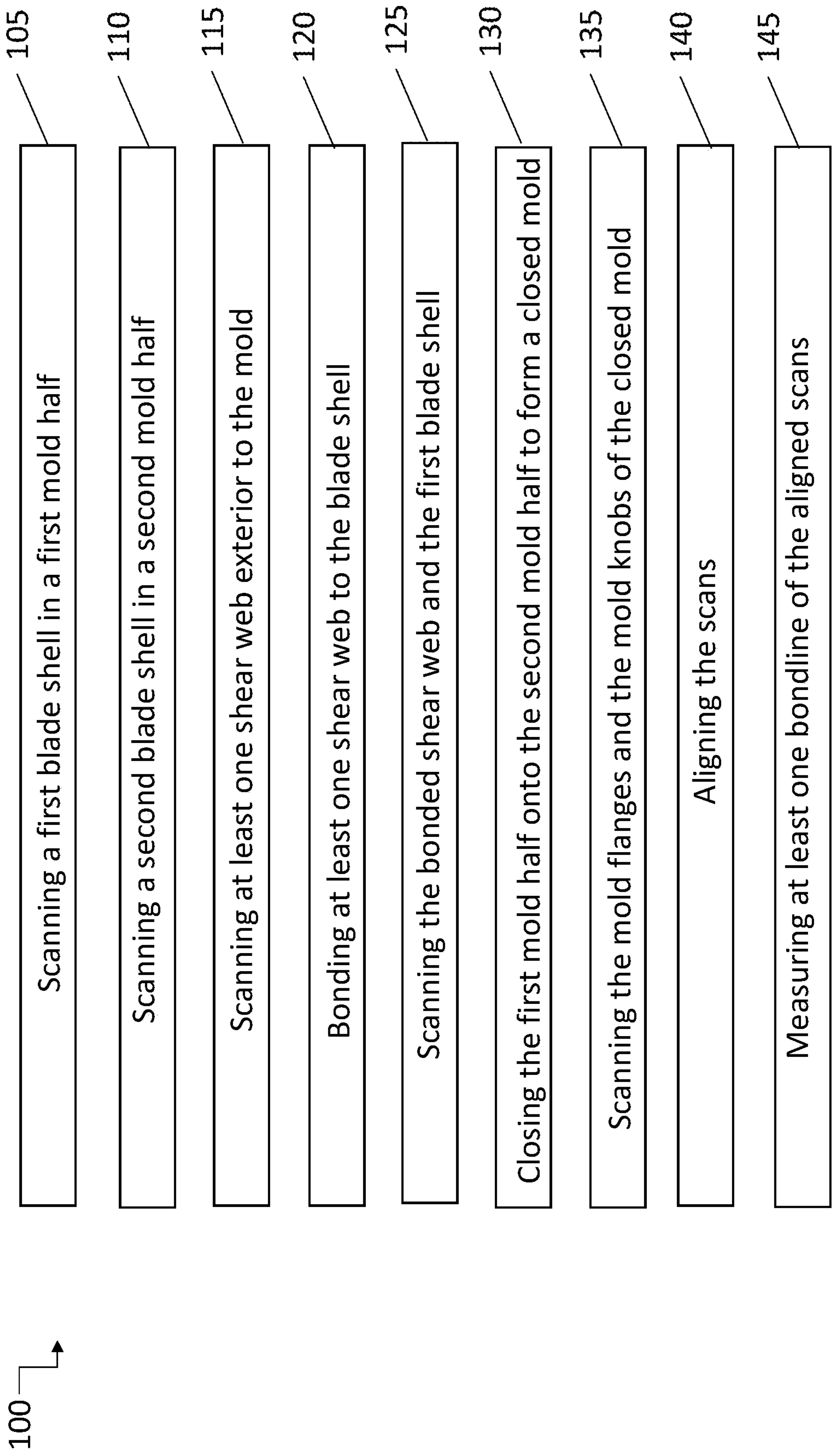
FIG. 1 is an exemplary method for 3D measurement of bondline thickness and width during turbine blade manufacture.

The methods and systems presented herein may be used for measurement of bondline thickness and width. The disclosed subject matter is particularly suited for three-dimensional measurement of bondline thickness and width during blade assembly using a three-dimensional optical laser scanner. For purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

The method and systems may allow for the freedom to get gap measurement from any desired location between web flange and shell surface with high fidelity. Producing high-quality wind turbine blades requires precise control of various manufacturing processes. One of the most crucial processes is the application of bondline paste. The accuracy of the bondline thickness and width directly impacts the blade's structural integrity and overall quality. Deviations in the bondline measurements can lead to quality issues, which may cause the blade to fail prematurely or reduce its energy output. Therefore, it is crucial to maintain a high level of accuracy in the application of the bondline paste to ensure the production of high-quality wind turbine blades that meet the customer's standards and requirements.

Identifying quality issues in wind turbines is essential to ensure the safe and efficient operation of these renewable energy sources. One of the critical factors affecting the quality of wind turbines is the bonding paste used in the manufacturing process. If the bonding paste does not meet the required thickness, quality defects can occur, leading to reduced performance and even failure. For instance, if the bonding paste's thickness is higher than it should be, gaps can occur between the blade shell and the webs' flanges, leading to reduced structural integrity and possible blade separation. Similarly, if the bonding paste's thickness is lower than it should be, clash in shell and/or TE side can occur between the blade shell and the webs' flanges leading to reduced bonding strength and possible blade permanent deformation. Therefore, it is crucial to carefully measuring the bonding paste's thickness to prevent quality issues in wind turbine manufacturing.

The detection of bonding paste quality issues is essential for wind turbine quality control. It is essential to measure the bonding paste's thickness accurately during the manufacturing process to identify any potential quality defects. Advanced measurement techniques such as ultrasound, x-ray, and visual inspection are commonly used to detect bonding paste thickness and identify any defects. However, by detecting defects early in the manufacturing process, manufacturers can take corrective actions to improve the quality of wind turbines and prevent any potential safety hazards. That's why measuring the bonding paste thickness between the blade shell and the webs' flanges in advance with a 3D digital measuring rather than manually, not only measuring the thickness values in advance, but also preventing a wrong measurement in thickness in manual method because the gaps are so low between the shell and flanges. Thus, regular quality inspections during the manufacturing of a wind turbine can ensure that any degradation in the bonding paste's thickness is detected and addressed before it causes any issues. Ultimately, careful measuring of bonding paste thickness is crucial for maintaining the quality and safety of wind turbines, contributing to the longevity and efficiency of these renewable energy sources.

The method which not only meets the customer specifications but also exceed all requirements of manual measurement is 3D digital measurement. This method has higher accuracy and can be measured in any desired locations and independent from human error. On the other hand, manual method is prone to fail, non-repeatable and has low accuracy on the contrary.

The present disclosure provides for the digital 3D measurement of the bondline thickness of the shear webs' before the shear web bonding to the blade shell utilizing the laser scanner device. The 3D laser scanner is a device that scans the related physical surface(s), e.g. measures the variation in wavelength frequency across a range of light spectrum (e.g. visible, ultraviolet, etc) and creates or replicates the geometric surface area instantly in the computer environment. With the help of high sensitivity of the 3D laser scanner, the bondline thickness of the blade assembly can be measured with high accuracy. To measure the gap, which defines the bondline thickness, between shear webs (flanges and/or upright web portions) and shells, also between bond caps and shells, 3D laser scanner device is used. Using the 3D laser scanner device, shear webs are scanned, especially the top and the bottom surfaces of the flanges.

As shown in FIG. 1, the method 100 for measuring a bondline thickness and width during turbine blade assembly is shown in flowchart form. To measure the gap between shear web and the inner shell surface as a digital measurement, related surfaces are scanned using one or more 3D laser scanner device. In various embodiments, the method may include, or be preceded by, cleaning one or more target surfaces to be scanned or measured. Cleaning the target surfaces may include manual or automated cleaning. In various embodiments, cleaning may include chemical or electrochemical cleaning, such as electrostatic dust removal. In various embodiments, the target surfaces may cleared of all consumables, such as bags or plastic layers. In various embodiments, the target surface may be a B surface.

In various embodiments, one or more three-dimensional scanning systems, apparatus or devices may be employed to measure the components described herein. One of skill in the art would appreciate the term "3D scanner" or "scanner" does not seek to limit the form factor or embodiment of the 3D scanning system or apparatus employed. In various embodiments, a 3D scanner may be a room-sized system, with disparate parts electrically or communicatively connected. In various embodiments, the 3D scanner may be a handheld scanner much in the form factor of a pistol-grip or end effector of an arm. In various embodiments, the 3D scanner may be one or more scanners or scanning systems operatively and communicatively coupled. In various embodiments, each scanner may be communicatively connected to a computer or computing system. In various embodiments, the computing system or computing environment may include a 3D computer-aided-design (CAD) environment that allows for visualization of points in space, for example, a scanned component may be measured by the scanner and a visualization of the relative geometry of the component may be loaded into the 3D CAD environment. In various embodiments, the computing device may be embodied as, include or be communicatively coupled to a controller and/or an acquisition device. In various embodiments the controller and/or acquisition device may be configured to collect the scanned data from a scanner system (e.g., C-track and MetraScan) and transmit the scanned data to the computing system 3D CAD environment. In various embodiments, the transmission may be via ethernet cable or wireless over an internet connection, cellular network, or another suitable wireless connection. The scanner system may include a tracker (e.g., C-track device) and a scanner (e.g., 3D laser scanner system, Metrascan). The scanner may be manually held by an operator and moved over a surface to scan the surface, while the tracker may be mounted on a mechanical fixture and held stationary.

In various embodiments, the scanner may be a C-track and MetraScan system. In various embodiments, the C-track may be a tracking device or system which continuously tracks spatial location and orientation of one or more probes, such as the MetraScan probe. In various embodiments, the MetraScan may be a probe which houses a plurality of retroreflective targets disposed about a spherical-shaped device configured to allow for visibility to the C-track system from any direction within the volume of the C-track trackable environment space. Thereby allowing 3D geometrical data of the components to be measured by the C-track and the MetraScan, as well as tracking of the MetraScan probe itself.

In various embodiments, each scanner may be installed in a single location, with the components and molds may be brought to the scanner for scanning. In various embodiments, the scanner may be brought to the components and the molds for scanning. In various embodiments, a single scanning procedure may include scanning using a larger system where the components are provided to the scanner, and a handheld scanner may be employed.

In various embodiments, the scanner may include warmup or calibration procedures. In various embodiments, these warmup or calibration procedures may be manual or automated. In various embodiments, the warmup or calibration procedures may be initiated by a human user, a computer system, or both. In various embodiments the scanner, including the MetraScan may be configured to emit one or more laser beams. In various embodiments, during the calibration procedure, the intensity of the laser beam emitted from the scanner may be adjusted based on the environmental factors such as surface reflectivity index. In various embodiments, the environmental factors may be dust, consumables (e.g., peel ply) and ambient lighting.

In various embodiments, a volume extension procedure is applied to the 3D scanner. The volume extension procedure can be applied to scan large-size parts in one scan without aligning smaller scanned subparts of the main part. Once the volume extension procedure is applied to the part, a volume extension file can be saved to the CAD environment or other electronic memory system. In some embodiments, the volume extension procedure can be performed before beginning a scanning process. The volume extension procedure serves to accelerate the scanning process and increase the accuracy of the scanned data. In various embodiments, retroreflective targets may be placed uniformly in dense fashion on one or more surfaces to be scanned. In the beginning of the volume extension procedure, these retroreflective targets placed on the surface are registered to the scanning 3D CAD environment (or scanning domain) by exposing them to the tracker (e.g., C-track device) to increase the scanning volume. In various embodiments, during volume extension procedure, a plurality of markers can be applied to the surface to be scanned, such as a blade half or blade mold component. In various embodiments, the plurality of markers may be adhered or secured to the scan surface so they do not move between scans or during the volume extension procedure. In volume extension prodcedure, the markers are introduced to C-track and the relative position of device to the part to be scanned is defined. The plurality of markers can be removed after scanning/volume extension procedure. In various embodiments, where more than one volume extension is required, the markers can be left on the surface and should not be removed.

If a surface or a part is scanned more than once, the volume extension file can be imported into the CAD environment software, provided that the markers are in the same location and the part is scanned according to the previously defined axis system (e.g. in the first volume extension application, the C-track position is based on an axis system that has been defined according to the constant marker positions). If the part is not to be scanned more than once, t the markers can be removed after scanning process.

During this introducing process, the tracker (e.g., C-track device) is handled and relocated continuously. Since the targets are scattered in a large area, they may be captured progressively and sequentially by the tracker (e.g., C-track device). In various embodiments, the method 100 may include fixing retroreflective targets on measurement area in a uniformly scattered pattern. In various embodiments, the method 100 may include fixing retroreflective targets on measurement area in a uniformly gridded pattern. In various embodiments, the method 100 may include fixing retroreflective targets on measurement area in a pattern matching the contours of the surface, such as a blade shell. In various embodiments, the retroreflective marking may be applied for each scan or a single time prior to the beginning of the scanning process.

Retroreflective Optical Markers

The methods and systems described herein facilitate high precision component relative position, e.g., shear webs and B surfaces (i.e. surface of the blade skin opposite the mold) of blade shells during/after molding processes. Particularly, the present disclosure introduces a novel apparatus and method which provides accurate geometric data scanning of a blade and mold. The present disclosure can include overhead optical projection and laser tracking systems for measurement tools to measure bondline thicknesses and widths between components.

The markers can be configured as retroreflective optical markers which are positioned on the surface of a blade component, and/or skin surface, that reflects radiation (e.g., light) back to its source with minimum scattering. In various embodiments, the markers can be specialized for a blade half or blade mold component. In various embodiments, the markers employed may have a similar or identical diameter based on the blade half or blade mold component to which they will be coupled. In various embodiments, each marker may be placed on the blade half or blade mold component at select locations to ensure proper depth of field, number of targets, target distribution and overlap of targets between adjacent scans. The markers may be secured to the blade half or blade mold component such that they do not move between scanning operations, including adjacent scans or scans that overlap some area of the blade half or blade mold component. In various embodiments, the markers may be placed such that the C-track or any tracker has at least four markers and the scanner (e.g., MetraScan) boundaries within its field of view at any point during the scanning process. In various embodiments, the markers may be formed as appliques or stickers wherein the markers are adhered to the surface to be scanned. In various embodiments, the surface may be cleaned before application of the markers. In some embodiments, the radiation source is an overhead optical (e.g., laser) scanner(s). In various embodiments, one or more scanners can be mounted on one or more arms or stands, such as a tripod. In various embodiments, the scanners can be orbited around the shear webs and blade halves manually or automatedly. In various embodiments, the scanners can be set up at a plurality of points and oriented with the scan target in its field of view. In various embodiments, as long as the scanner (e.g., MetraScan), markers and shear web are confined in a scanning volume of the tracker (e.g., C-track device), the tracker can orbit around shear web to have access areas which are intended to be scanned. One or more laser beams emitted from the scanner (e.g., MetraScan) device can scan the surface.

In various embodiments, where the volume extension method is applied before scanning process, the C-track can be moved manually or automatedly to see the entire shear web/surface where markers are applied. In various embodiments, the C-track can be located at an optimal distance from the surface during scanning such that it remains in scanning volume.

Each scanner can project a plurality of beams, with each beam dedicated and directed towards a single marker. In some embodiments, the trajectory of beams can be adjusted to irradiate a plurality of markers. The relative coordinates of the overhead projector(s) can be fixed with respect to the blade mold during the manufacturing process. Similarly, in some embodiments the overhead projectors(s) remain fixed during operation; conversely, in some embodiments the overhead projectors can be adjusted (e.g., laterally, longitudinally and vertically such as lowered towards the mold).

In some embodiments, the markers are configured as a separate device or component that is (removably) attached to the blade component/surface. In some embodiments each marker can reflect a unique spectrum (e.g., color) of light from the source. Additionally or alternatively, the marker can be a surface feature integrally formed with the component/surface. The number and location of the markers can vary depending on blade design specifications, e.g., number of spar caps and shear webs, location and size, etc.

In various embodiments, the distribution of markers need not be uniform but instead concentrated in select areas of the blade. The number, distribution and geometry of the markers can vary along the blade span, e.g., there can be a greater concentration of markers at locations with large/heavy internal components and/or more complex geometry or surface contours, e.g., with a greater number of markers located proximate the root as compared to the tip of the blade.

In various embodiments, markers can have a bulbous, e.g., semispherical shape which projects outwardly from the exterior surface of the blade component; however markers of alternative geometries (e.g. curved, non-linear, asymmetrical) are within the scope of the present disclosure. In some embodiments the markers are configured with a curved surface(s). Additionally or alternatively, in some embodiments the markers are formed with linear surfaces (e.g., facets). In various embodiments, the retroreflective optical markers placed on the body of the assembly components enable the over-head projection system to capture the spatial position of components. In embodiments in which a complete 3D geometric spatial data of each part is desired, multiple markers on are included at different points (e.g., top surface, left side, right side, width, etc.) located on the assembly item.

The coordinates of selected markers may be predetermined to accurately support the geometrical scanning process. Accordingly, location of the reference markers can be first specified in the 3D manufacturing model of the blade mold, blade shell, or 3D CAD environment, and are specific to the component geometry as well as the scanned data that is desired to be collected. In order to fabricate the mold (which will be employed to fabricate wind turbine blades), a male “plug” is first formed to serve as the structure which imparts the specified geometry into the mold. During plug build, marker points can be formed, e.g., CNC machined, into the plug surface. The marker locations can thereafter transferred to or imparted within the final mold and can serve as a seat for hosting/receiving retroreflective markers.

In various embodiments, the markers can be affixed or integrated directly into the component surface, such as any one of the shear webs, blade shells and/or molds. Additionally or alternatively, the markers can be a discrete structure that is coupled to the component via an arm that extends from a surface of the component. The arm can be sized, and positioned, and articulated such that the marker is not obscured from the field of view of the overhead projector such that the beams projected therefrom are not blocked or interrupted by a portion of a flange component.

Figure 13:
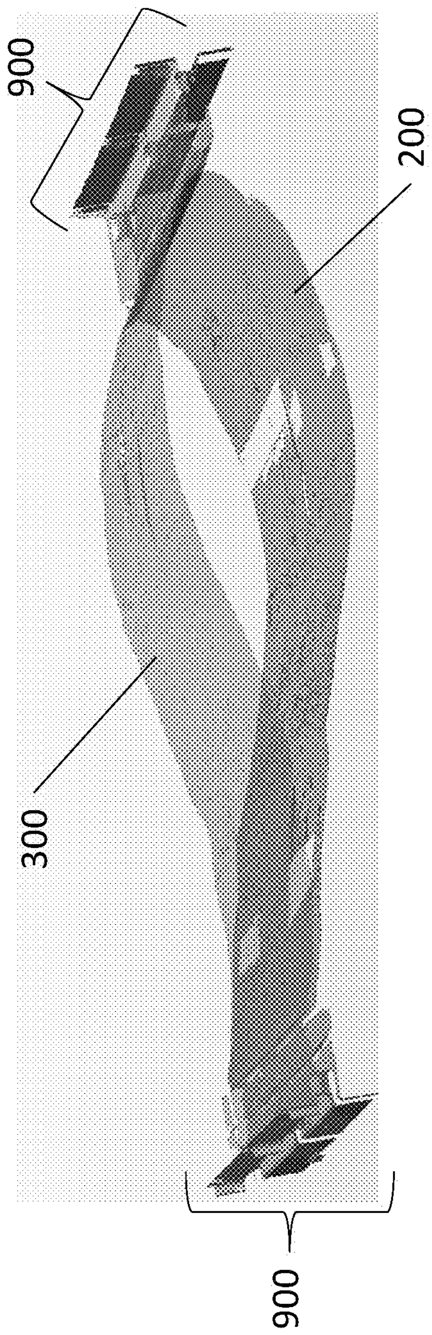
FIG. 13 is a schematic representation of an overlay of scanned data of the shared mold flanges and knobs of the suction side and pressure side shells.
Figure 14:
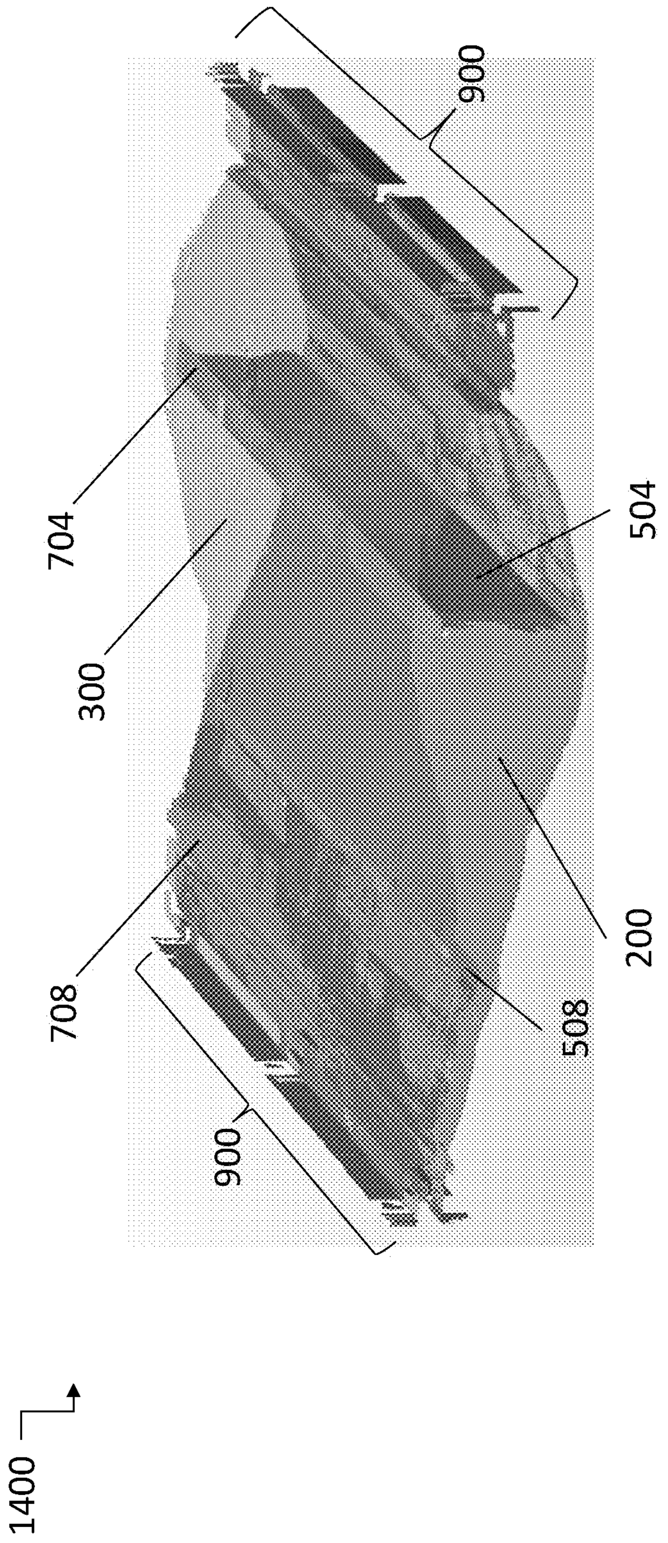
FIG. 14 is a schematic representation of full overlay of scanned data of a blade and mold with shear webs within a scan radius.

With continued reference to FIG. 1, method 100 includes, at step 105, scanning a first blade shell 204 disposed in a first mold half 208 and forming a first scan 200, as shown in FIGS. 2A-C. Scanning the shell and molds may include scanning with a 3D laser scanner as described herein above. For example, scanning the blade and mold may include locating the (removable) retroreflective markers on the blade mold and scanning the location to measure the geometry of the blade and blade mold. Scanning can be performed over the entire surface area of the blade mold, or between select markers, as desired. In various embodiments, the 3D data generated by the laser scanner may be transmitted to a computing environment such as the 3D CAD environment (an example of a 3D visualization is shown in FIGS. 13-14).

First blade shell 204 may be a composite laminate component molded within the first mold half 208. First blade shell 204 may have been formed in first mold half 208 and remain inside the mold for assembly as described herein. Dashed line 210 in FIG. 2A depicts the surfaces included in the scanning operation (e.g., the scanned surface can include all exposed surfaces, on the B-side, in the open mold half 208). First blade shell 204 may be a pressure side (PS) of a turbine blade. In various embodiments, the first blade shell 204 may have an A side, defined by the surface of the blade touching the first mold half 208. In various embodiments, the first blade shell 204 may have a B side, defined by the surface opposite the A side, exposed in the first mold half 208 and facing the interior of the turbine blade when assembled.

The blade and/or the mold may have any internal core features, as well as any geometrically assembly guides configured to locate the features related to core panel placement in the mold (e.g., distance from trailing edge, spar cap, etc.). These additional patterns can be based on the location, and/or type of core structure/material within the mold. Some exemplary core materials include end-grain balsa, styrene acrylonitrile (SAN) foam, polyvinyl chloride (PVC) foam and polyethylene terephthalate (PET) foam. In some embodiments, e.g., balsa and foam cores, the cores may be scored or segmented to create hinges that allow it to conform to curved surfaces. This scoring can create gaps in the surface of the core where one segment angles away from another. Accordingly, the additional patterns can be focused on these “problem” areas where there is a higher risk/likelihood of gaps forming. Additionally or alternatively, there can be a higher concentration of additional patterns located in the higher load-bearing sections, e.g., root, than in the lower load-bearing sections of the blade.

In various embodiments, first mold half 208 may have mold flanges 212 disposed on radial sides of the mold, the flanges 212 having generally planar surfaces extending along the length of the mold and extending a distance from the mold surface laterally. In various embodiments, the mold flanges 212 may include (removable) mold knobs 216 configured to assist in locating molds relative to one another, for example, during the mold closure process. In various embodiments, two mold halves may include corresponding knobs 216 or features configured to matingly couple and align the molds on which they are disposed, for example and without limitation the knobs 216 may include a boss corresponding to a recess, as shown in FIGS. 2A-C, 3, 4, 10 and 15. In various embodiments, the knobs 216 may be dog (or ‘doggy’) bone shaped. In various embodiments, a plurality of knobs 216 may be disposed along the length of the mold halves, and project perpendicularly from the surfaces of the mold. In various embodiments, first mold half 208 may include a leading edge (LE) bond cap 220 and a trailing edge (TE) bond cap 224 as shown in FIG. 11. In various embodiments, the bond caps may be configured to cover the bond line of blade halves. In various embodiments, the bond caps may be formed in multiple discrete pieces and assembled together with the blade halves or separately.

In various embodiments, the wet cast operation is utilized to obtain the gaps between the first (and second) blade shell’s areas, where the bonding paste is applied, and at least one of the shear webs’ flanges. In various embodiments, the thickness of the bond caps of the PS shell and SS shell. In various embodiments, the bonding paste application is performed where the bond caps are available and accessible as well. In various embodiments, any gaps between the bond caps of the blade shells are scanned as well to obtain the paste thickness to determine whether there is any core clash (e.g., deformation or crush) or greater TE thickness than customer specification or exists.

Figure 2:
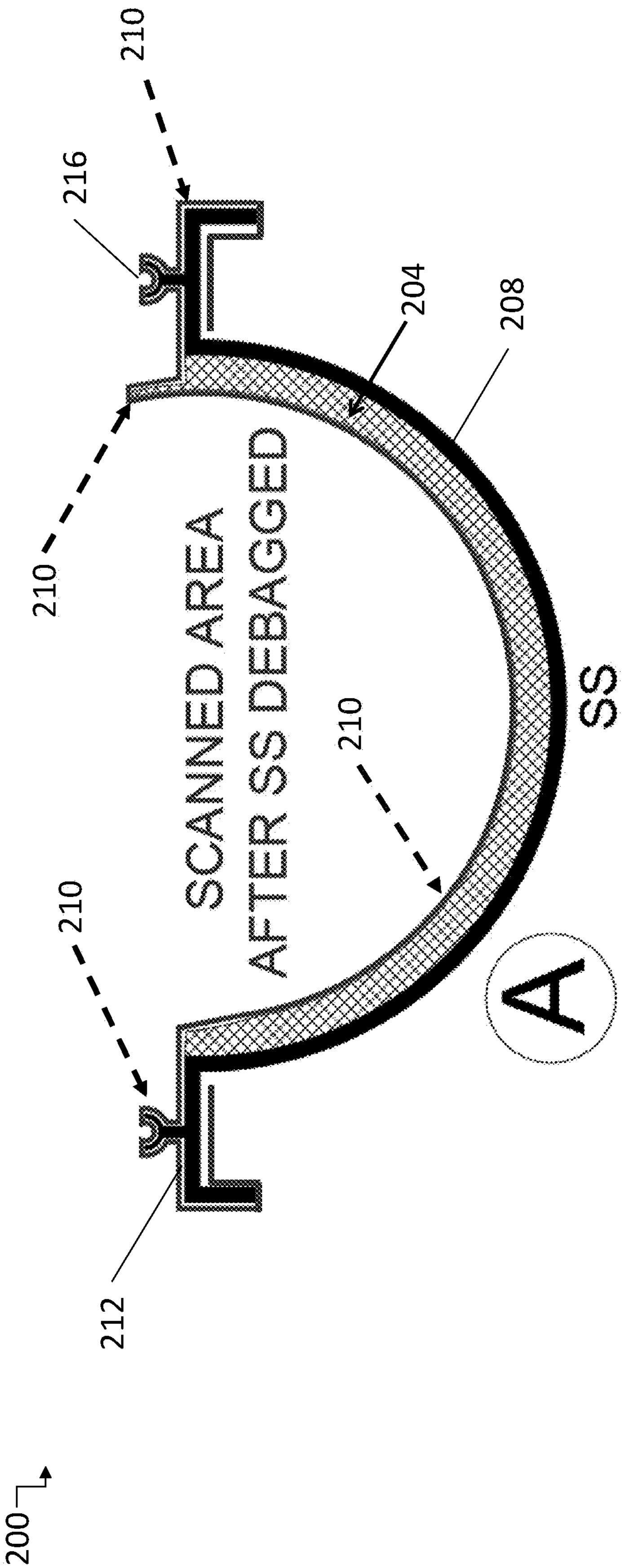
FIG. 2 is a schematic representation of scanned data of B surface of a pressure side shell with mold flanges and knobs.
Figure 3:
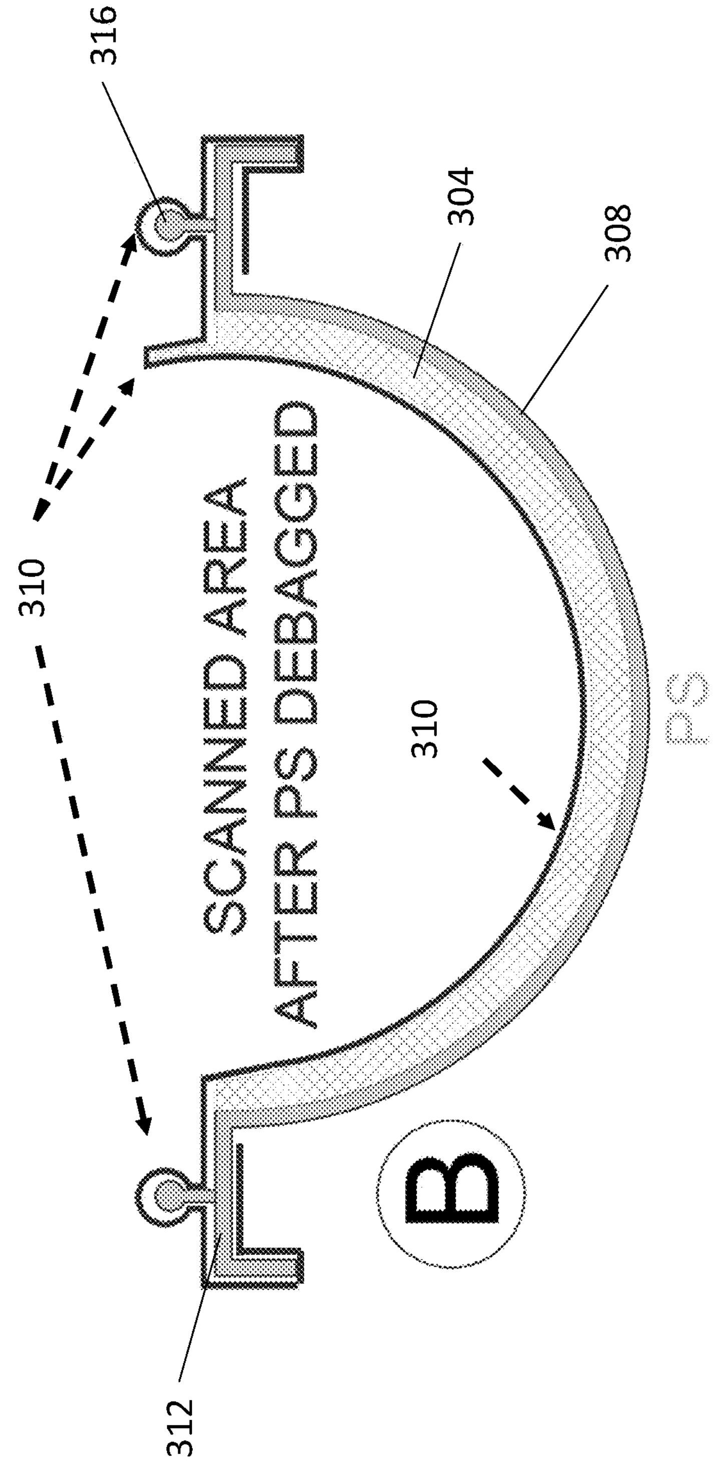
FIG. 3 is schematic representation of scanned data of B surface of a suction side (SS) shell with its mold flanges and knobs.
Figure 4:
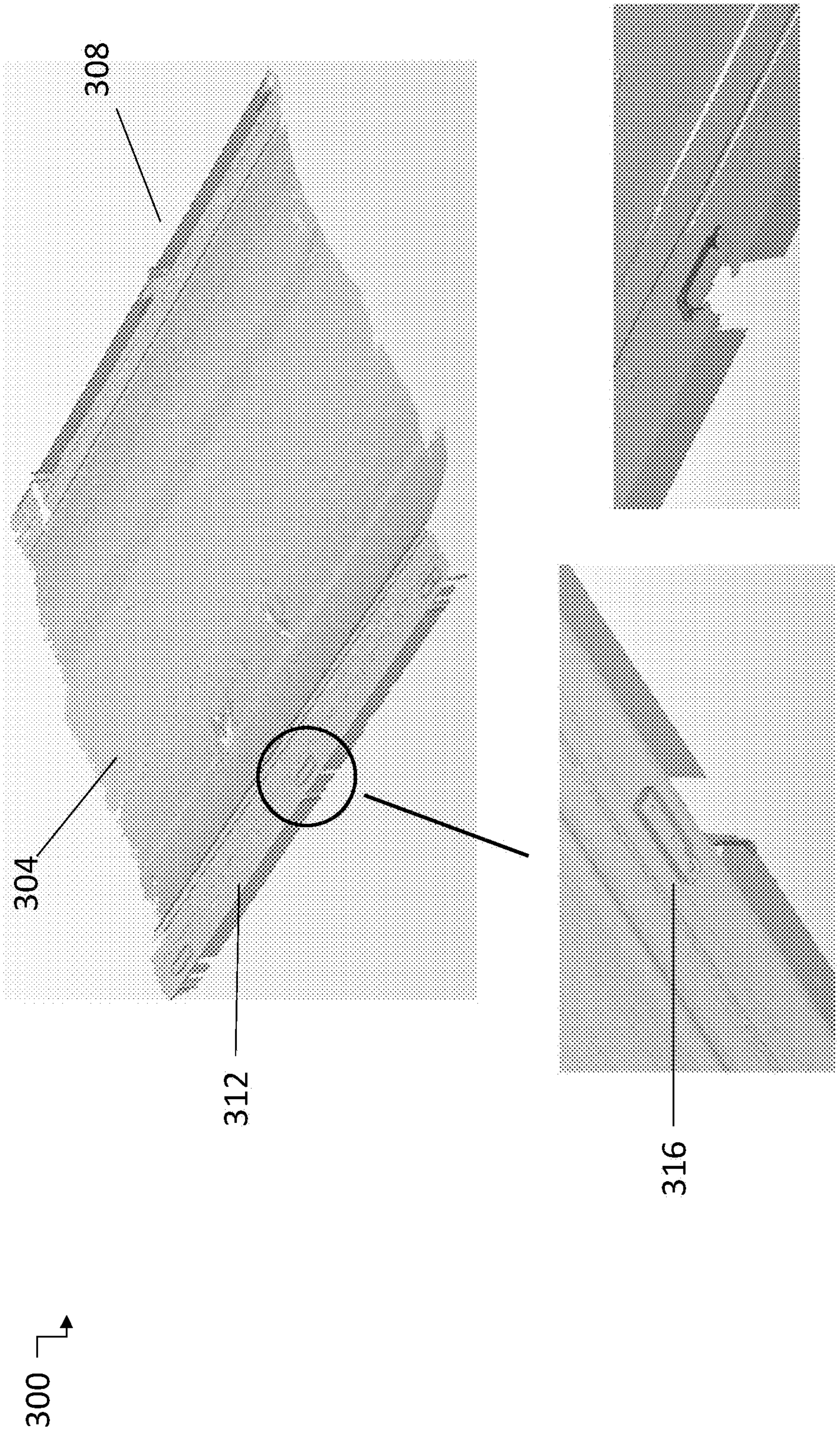
FIG. 4 is a schematic representation of scanned data of B surface of a pressure side (PS) shell with its mold flanges and knobs.

With continued reference to FIG. 1, method 100 includes, at step 110, scanning a second blade shell disposed within a second mold half and forming a second scan. In various embodiments, scanning may include scanning a second blade shell 304 disposed within a second mold half 308 and forming a second scan 300 as shown in FIGS. 3-4. Scanning the second blade shell 304 may include scanning the shell after the second blade shell 304 is cured in a vacuum-assisted resin transfer molding (VARTM) process and the vacuum bag or other plastic layers are removed from the B side of the suction side (SS) of the blade. Scanning the second blade shell 304 and second mold half 308 may include scanning the flanges 312 and knobs 316, which may be the same or similar to flanges 212 and 216 above. Similarly to the scan line 210 described in connection with the suction side blade half of FIG. 2A described above, the scan of pressure side is shown by reference numeral 310, which covers all exposed surfaces on the B-side of the pressure side mold half. That is, second blade shell 304 may correspond to the suction side of a wind turbine blade. In various embodiments, the second blade shell 304 may include similar or identical contours to the first blade shell 204. In various embodiments, the second blade shell 304 may have distinct contours from the first blade shell 204. In various embodiments, the second blade shell 304 may include contours that extend along the entire length of the blade shell. In various embodiments, the second blade shell 304 may include contours unique to certain portions of the mold, such as cylindrical proximate a root of the blade mold and harsher, more linear contours proximate the tip portion of the mold. In various embodiments, the blade root section may include more layup segments than the tip section, and often with a more complex geometry. For example, the root section often includes load bearing components (e.g., root inserts), with a greater radius of curvature than layup segments of the tip section. While root section includes all the major structural layers, tip elements are mainly composed of local reinforcement layers for lifting and positioning purposes.

Thus, since the density of the reinforcement layers in the vicinity of the blade root is higher, in some embodiments of the presently disclosed subject matter, each mold and its corresponding reinforcement materials are divided into two separate sections or regions; e.g., root and tip. An exemplary line may be at approximately mid-span, thus depicting the root section and tip section as approximately equivalent in length. However, it is to be understood that the division of first (e.g., root) and second (e.g., tip) sections can be scaled as desired, depending on the varied complexity of each section. Also, the blade can be divided into any number of sections as needed to track the varying complexity of core components and shear webs along the blade length. In other words, the system can employ any number of sections needed to accommodate the changing shear webs, contours, and gaps therebetween.

Figure 5:
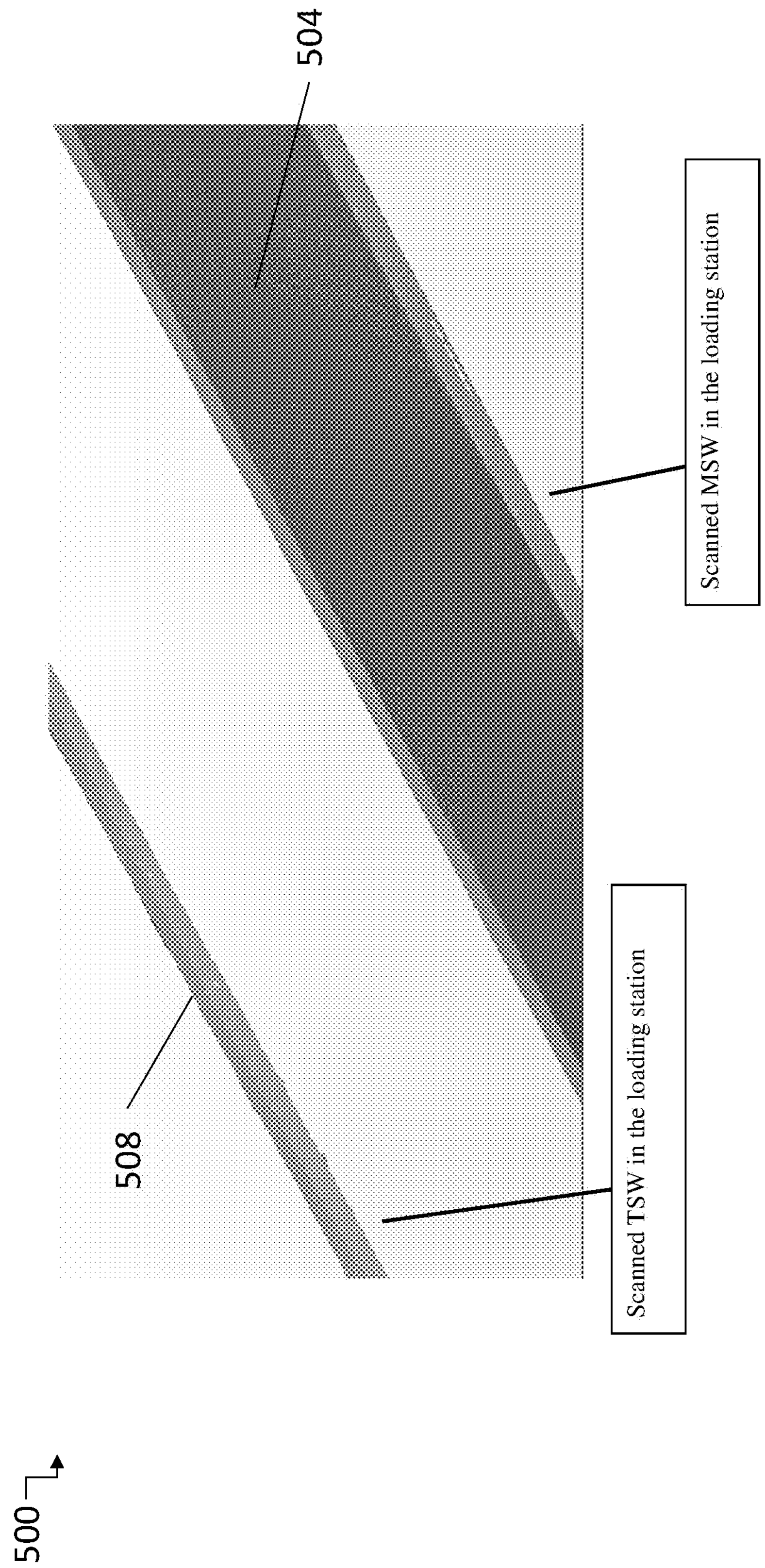
FIG. 5 is a schematic representation of scanned data of a main shear web (MSW) and trailing shear web (TSW) loaded in the loading station.

With continued reference to FIG. 1, method 100 includes, at step 115, scanning the at least one shear web exterior to the mold, forming a third scan. An exemplary embodiment of third scan 500 may include a scan of MSW 504 and TSW 508 as shown in FIG. 5. Scanning at least one shear web exterior to the mold (first or second mold half 208, 308) may include scanning a main shear web (MSW) 504 and a trailing shear web (TSW) 508. MSW 504 may include an approximately planar body extending between two flanges, each of the two flanges approximately perpendicular to the body and configured to abut a B side of the blade halves and adhered thereto with paste. TSW 508 may be an angled component having two approximately planar segments joined are bent at a vertex, with the vertex of the TSW 508 disposed at the trailing edge of a turbine blade. In various embodiments, the TSW 508 may include two generally arcuate segments joined at the vertex, the two segments having contours matching the turbine blades trailing edge. In various embodiments, as shown in FIG. 6A, TSW 508 may include a main body extending between two angled flanges, the flanges configured to be parallel to the blade halves closed thereover. In various embodiments, the flanges may include corresponding contours to the blade halves.

Figure 6:
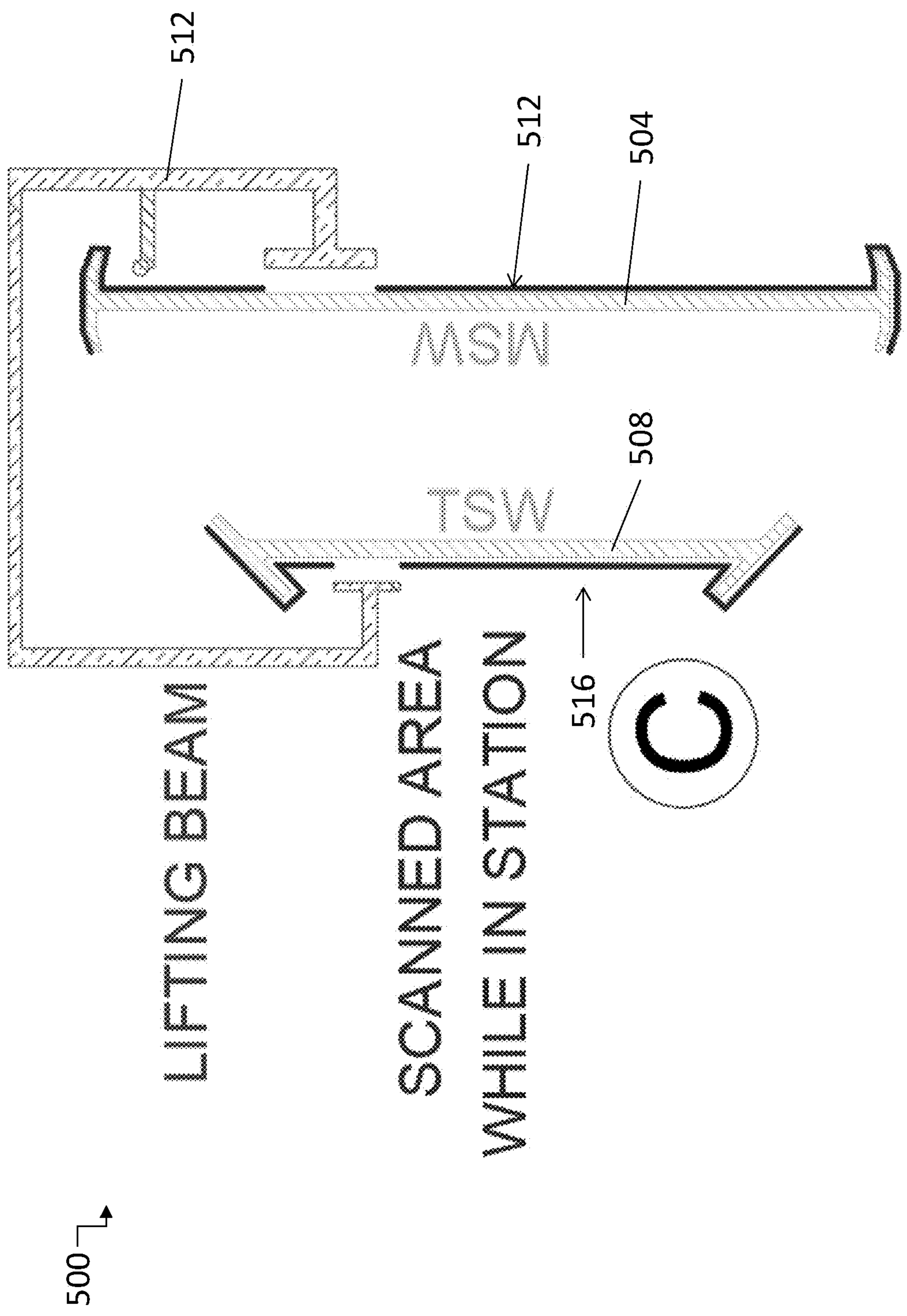
FIG. 6 is a schematic representation of scanned data of the MSW and TSW loaded on the lifting beam.

In various embodiments, scanning the shear webs 504, 508 include scanning the shear webs exterior to the mold on a loading station. In various embodiments, scanning the shear webs 504, 508 may include scanning the complete shear webs, such as both body and flanges. In various embodiments, scanning the shear webs 504, 508 may include scanning said shear webs on a loading device, such as a crane or lifting beam. In various embodiments, the lifting beam may be a tool configured to hold and suspend the shear webs over the blade shell within the mold half for installation and loading into the blade. In various embodiments, scanning the shear webs on the lifting beam may include scanning the visible portions of the shear webs in the loading beam, as shown in FIGS. 5-6. Scanning the shear webs exterior to the mold may include scanning the shear webs in storage. In various embodiments, scanning the shear webs exterior to the mold may include scanning the shear webs during installation on the blade shell 204. In various embodiments, scanning the shear webs 504, 508 may include scanning the shear webs relative to a shear web coordinate system. Scanning the shear webs 504 may include forming a scan 512, 516. The scan 512 may be 3D geometrical data corresponding to a portion of MSW 504, as shown in FIG. 6. The scan 516 may be 3D geometrical data corresponding to a portion of TSW 508, as shown in FIG. 6. In various embodiments, the body of the TSW 508 and MSW 504 may be scanned around or within the lifting beam.

With continued reference to FIG. 1, method 100 includes, at step 120, bonding at least one shear web to the first blade shell. In various embodiments, bonding the at least one shear web to the first blade shell 204 may include bonding the MSW 504 and the TSW 508 to the B side of the first blade shell 204. In various embodiments, the MSW 504 and TSW 508 may be bonded to the pressure side blade shell. In various embodiments, the MSW 504 and TSW 508 may be bonded to the suction side blade shell. In various embodiments, the MSW 504 and TSW 508 may be bonded manually by a human, such as manually aligning the shear webs in the interior of the blade shell. In various embodiments, the shear webs may be electronically or automatedly aligned via one or more projections, automated marking procedures, or geometrically aligned via mounting surfaces configured to provide a clean bond between the shear webs and the blade shell.

In various embodiments, bonding may include adhering the shear webs to the blade shell via liquid or semi-liquid bonding adhesive. In various embodiments, the bonding adhesive may be applied to one or both of the shear webs and blade shell and pressed together. In various embodiments, the loading beam described above may be lowered from above the mold half (208) and placed in mounting position within the blade shell (204). In various embodiments, the at least one shear web may be mounted along specified contours spanning from the root portion of the blade shell to the tip portion of the blade shell. In various embodiments, the at least one shear web may be mounted in the blade shell at an angle to the span or transverse to the span of the blade shell. In various embodiments, the at least one shear web may be held under pressure against the blade shell, to allow for curing of the bondline formed between the shear webs and the blade shell. In various embodiments, one or more shims or standoffs may be placed between the shear webs and the blade shell to form a bondline of an intended thickness.

In various embodiments, the bondline thickness may be constant between the at least one shear web and the blade shell. In various embodiments, the bondline thickness may varying depending on location of the at least one shear web and the blade shell. For example and without limitation the at least one shear web may form a larger bondline thickness between a root portion of the blade shell than the tip portion, vice versa, or at any point therebetween.

Figure 7:
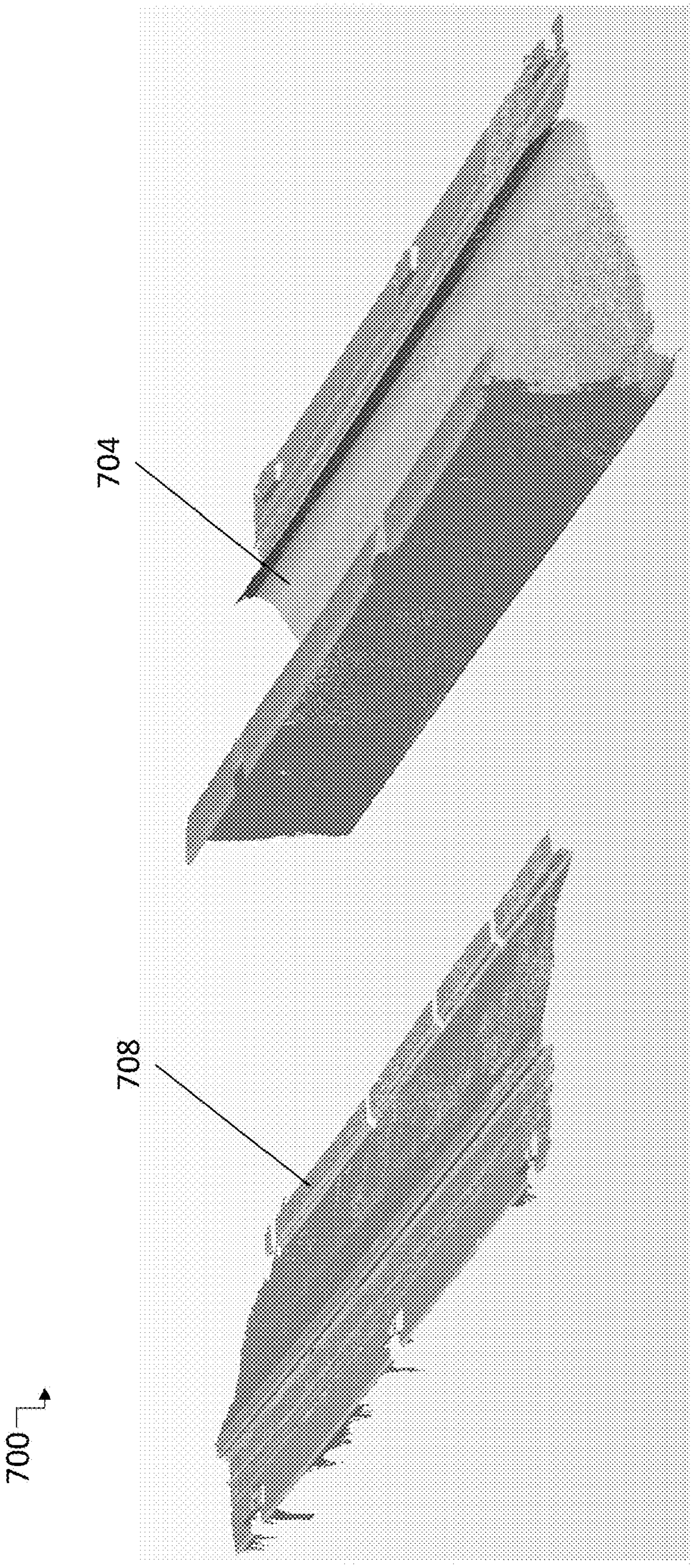
FIG. 7 is a schematic representation of cured MSW and TSW while they are bonded to B surface of suction side shell.

With continued reference to FIG. 1, method 100, includes, at step 125, scanning the bonded shear webs (MSW 504, TSW 508) and first blade shell 204, forming a fourth scan 700. In various embodiments, scanning the bonded shear webs and the first blade shell 204 may include scanning the entirety of the TSW 508 and MSW 504 and first blade shell 204, including first mold half 208. After webs are bonded to the B surface of the SS shell, which includes the webs with bonding paste, the shear webs and the blade shell are scanned. In various embodiments, the cured webs (MSW 504 & TSW 508) on the B surface of the (SS) second blade shell 308. This scanning process may include the inner fillet of the bottom flange of the MSW 504 and TSW 508 which connects the B surface of the SS shell and the shear webs' body. Thus, a portion of the web body which is close to the inner fillet of bottom flange and a portion of the B surface which is close to the inner fillet of bottom flange of the web are scanned together as shown in FIG. 7. This scanning process is performed to create a link (shared/common areas) between cured webs and B surface of the SS second blade shell 308 in a 3D CAD environment. In various embodiments, the link may be a shared area that is above a certain threshold relative to the entire surface area of the scan. In various embodiments, the link may be a shared area of a threshold area (e.g., 0.25 $m^2$, 1 $m^2$). In various embodiments, the link may include an area proportionate to the scan. In various embodiments, the user may identify the link area. In various embodiments the system, scanner, CAD environment or another component may prompt the user to scan a predetermined area.

Figure 8:
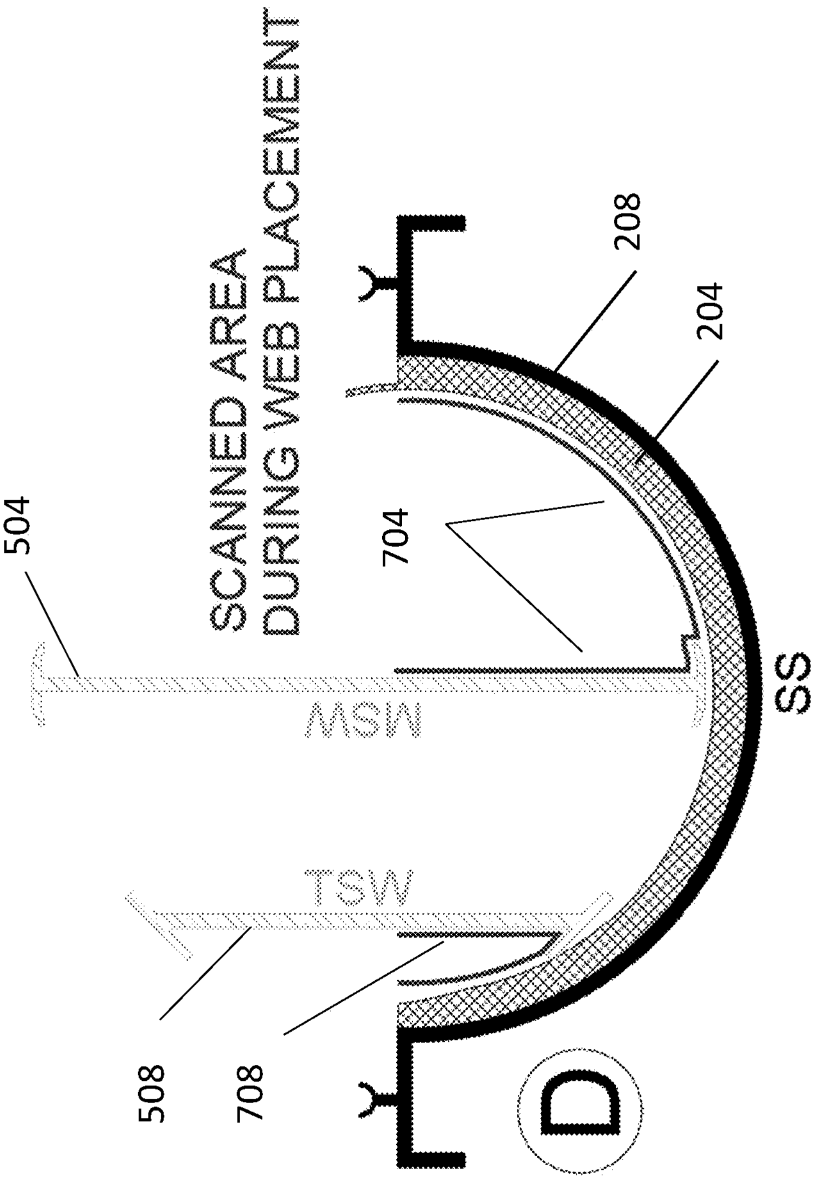
FIG. 8 is a schematic representation of scanned data of cured MSW and TSW while they are bonded to B surface of suction side shell.
Figure 9:
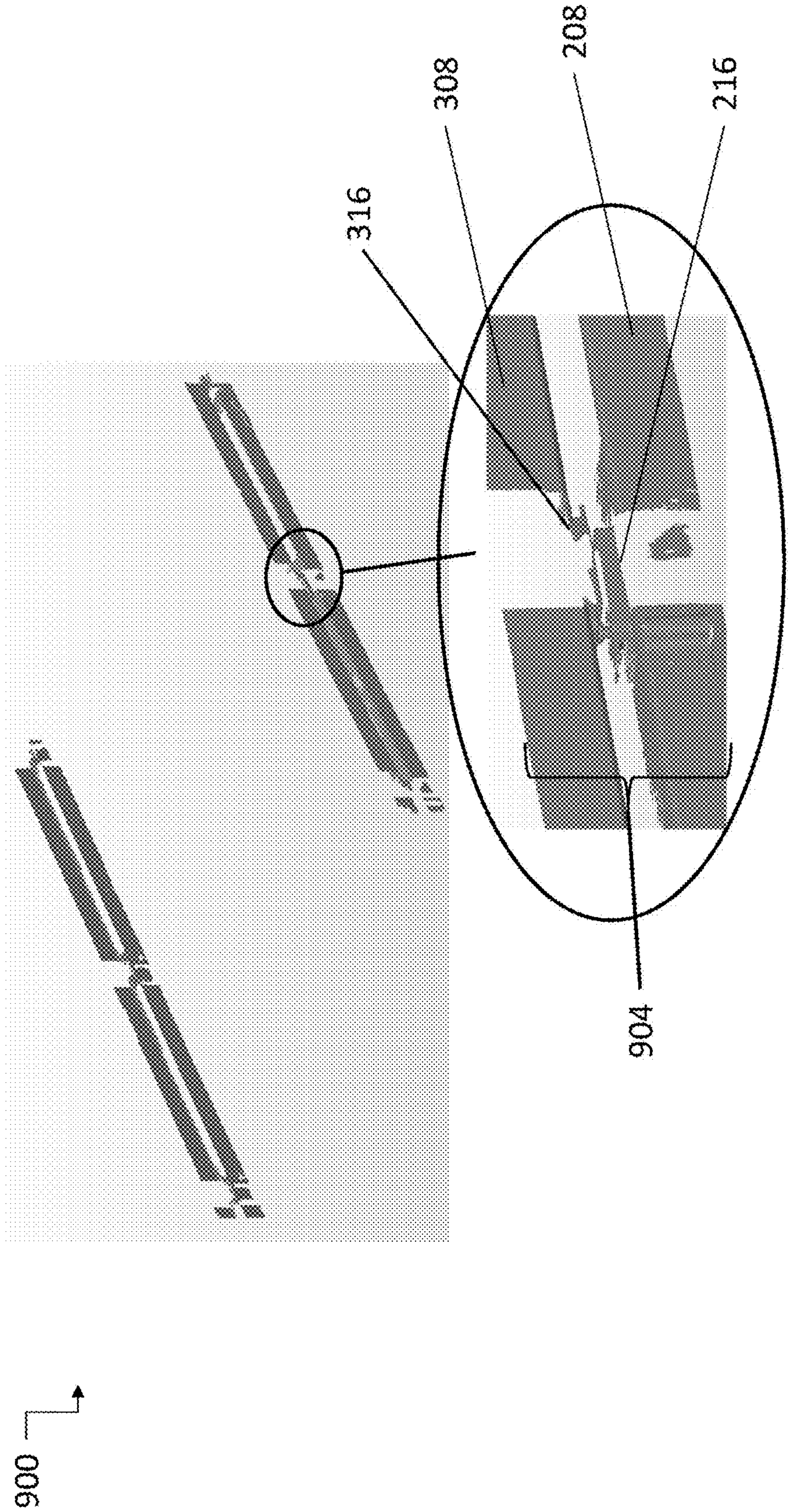
FIG. 9 is a schematic representation of scanned data of mold flanges and knobs during mold closure.

In various embodiments, scanning the bonded shear webs and blade shell may include scanning the bondline between the MSW 504 and the TSW 508 and the first blade shell 204. In various embodiments, scanning the bonded shear webs and blade shell may include scanning the gaps between one or more bond caps and blade shell. In various embodiments, a single side of each of the MSW 504 and TSW 508 may be scanned or separately scanned as shown in FIG. 8. As shown in FIG. 8, the outermost side of each of the MSW 504 and TSW 508 are scanned along with the B surface of the first blade shell 204 proximate the flange bonded thereto. In various embodiments, only the flanges of the MSW 504 and TSW 508 may be scanned in order to identify the position of those flange surfaces to be bonded to the blade shells. In various embodiments, the fourth scan 700 may be made up of the MSW scan 704 and the TSW scan 708, each depicting the bonding between the MSW 504 and TSW 508 and the first blade shell 204 surface proximate the bond.

With continued reference to FIG. 1, method 100 includes, at step 130, closing the first mold half onto the second mold half, forming a closed mold 904 and forming a fifth scan 900. In various embodiments, the scanning process is completed by scanning the flanges 212, 312 and knobs 216, 316 of the molds 208, 308 during mold closure (SS and PS). This scanning process is performed to create a link between SS shell & PS shell shared flanges and knobs as explained in the 3D CAD (computer automated design) environment. SS shell is scanned with its mold flanges and upwardly projecting knobs as shown in FIG. 2. PS shell is scanned with its mold flanges and knobs as shown in FIG. 3. The same flanges and knobs can also be scanned during mold closure process. Accordingly, while using shared scanned areas (including flanges and knobs) both shells are aligned together.

In various embodiments, the first mold half 208 may be kept stationary with the second mold half 308 rotated and closed in a clamshell fashion thereover to form a closed mold 904. In various embodiments, the reverse may occur, here the second mold half 308 may be kept stationary and planar, with the first mold half 208 rotated and closed thereon. In various embodiments, the first mold half and second mold half may be rotatably coupled therebetween, such that the rotation of one mold half onto the other may trace an arcuate path about the rotational coupling. In various embodiments, the mold halves 208, 308 may be closed manually. In various embodiments, the mold halves 208, 308 may be closed automatedly via one or more actuators. In various embodiments, the actuators configured to close the molds may include alignment features to locate one mold half onto the other. In various embodiments, the mold halves may include alignment features configured to prevent closing the mold incorrectly. In various embodiments, the knobs 216, 316 on corresponding mold flanges 216, 316 may matingly fit together such that the closed mold aligns the blade shells 204, 304 held therein. In various embodiments, the knobs 216, 316 may include tapered bosses and protrusions to allow for ease of insertion of one into the other. For example knobs 216, 316 may align the first mold half 208 onto the second mold half 308 at the full insertion position.

Scanning the closed mold 904 to form fifth scan 900 may include scanning the closed mold 904 from the side, as opposed to the previous four scans, which may have been largely approached from above the molds. In various embodiments, a scanner mounted above the closed mold 904 may also be utilized to scan the closed mold 904 from the side and configured to have the closure in the field of view of the scanner.

In various embodiments, the raw scanned data may be in a point cloud format. The point cloud format may be converted to polygonal mesh data for post-processing and alignment. In various embodiments, in the post-process analysis, at least one polygonal mesh model can be simplified using mesh cleaning tools. In various embodiments, the mesh cleaning tools may include isolated patch removal, singularity vertices removal, decimating, or any other suitable mesh cleaning tools.

With continued reference to FIG. 1, method 100, includes at step 140, aligning the first, second third and fourth scans in the 3D CAD environment. In various embodiments, aligning the scans may include aligning any of the first, second, third, fourth, and/or fifth scans. In various embodiments, aligning the scans may include aligning the fourth scan 700 of the cured TSW 708 and the MSW 704 with the first scan 200 of the first blade shell 204 as shown in FIG.

Figure 12:
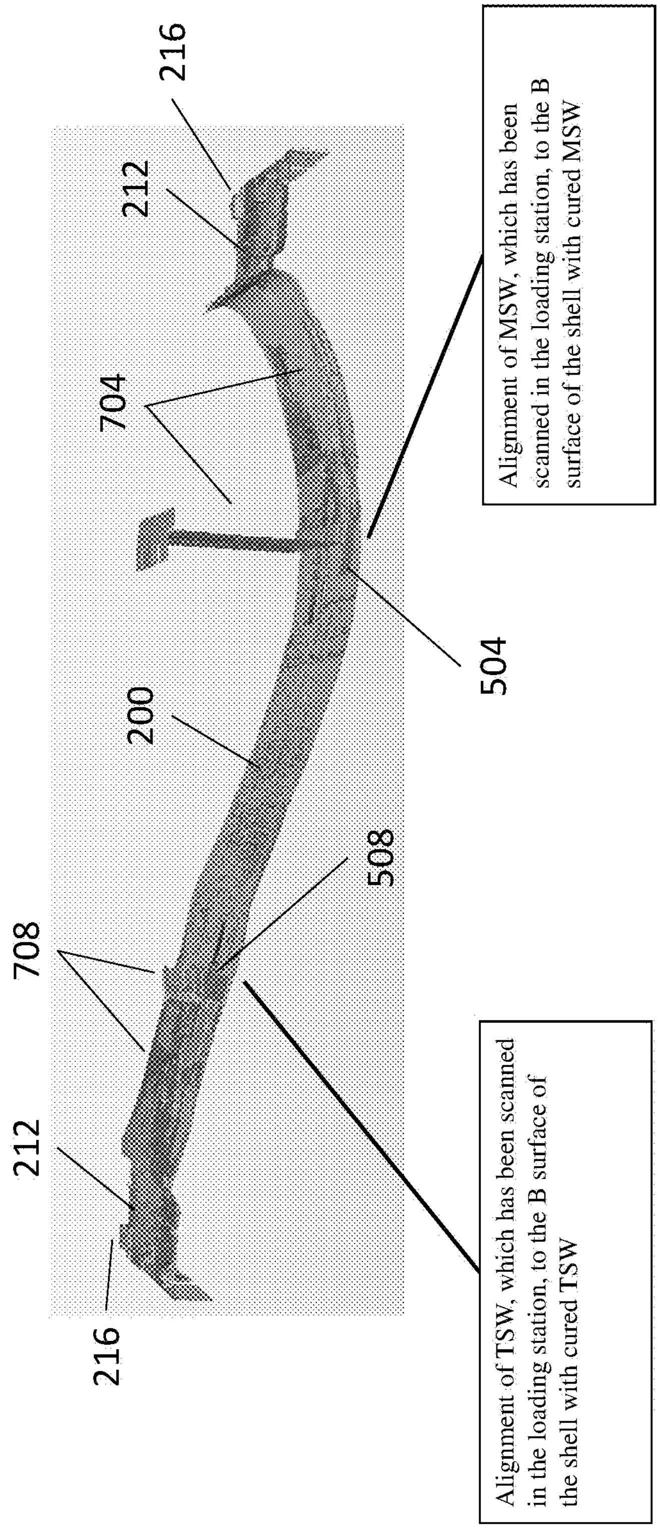
FIG. 12 is a schematic representation of an alignment of scanned data of MSW and TSW overlayed on scanned data cured MSW and TSW bonded to suction side shell.
Figure 19:
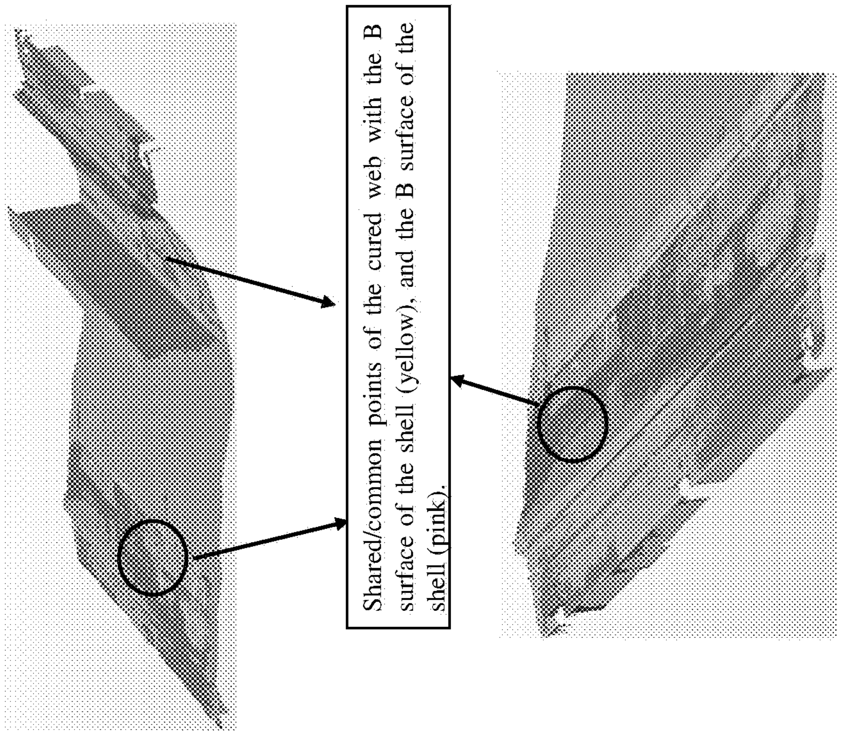
FIG. 19 is a schematic representation of an alignment of scanned data showing cured MSW and TSW bonded to shell and shell scanned data.

11. In various embodiments, aligning the scans may include aligning the fourth scan 700 of the cured TSW 708 and the MSW 704 with the first scan 200 of the first blade shell 204 with the exterior scans of the MSW 504 and the TSW 508 overlaid thereon as shown in FIG. 12. In various embodiments, aligning the scans may include aligning the first and the second scans 200 and 300, by aligning the flanges and knobs as shown in FIG. 13. In various embodiments, the alignment process may be performed in various steps, including simultaneously. In various embodiments, alignment may include a point alignment. For example and without limitation, in a point alignment, a set of common points 1904 are selected as a pre-alignment in order to make alignment process faster and with a higher success rate and higher accuracy. Using these common points 1904, a best fit algorithm may be applied to align all points in the shared area by minimizing an alignment deviation. Selecting the common scanning points 1904 that have already been scanned on the software and alignment of these common scanned points are depicted in FIG. 19.

Figure 20:
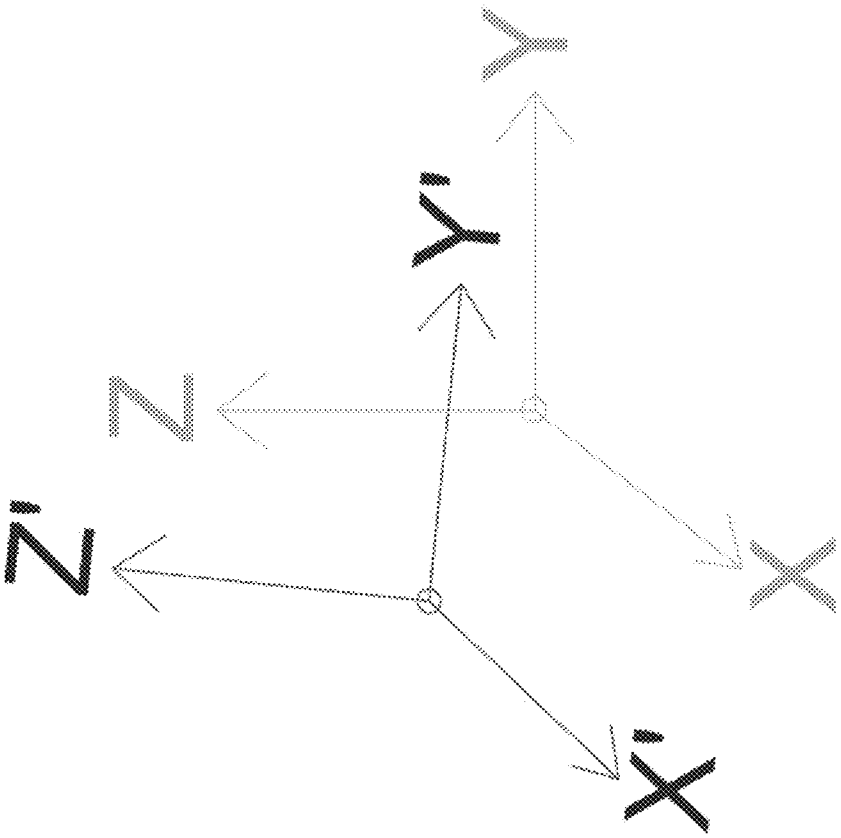
FIG. 20 is a representation of axis alignment in accordance with the disclosed subject matter.

In various embodiments, alignment may include one or more axis alignments. Each scan may include its own coordinate system and therefore axes. Axis alignment may include manually or automated aligning the axes as seen in FIG. 20. Since the scanned data coordinate system may be centered at the scanning device location and the device is relocated in various positions to scan the entirety of the part (blade shell and mold half), as well as each individual scan. Each scan of the first, second, third, fourth and fifth scan may include scanned 3D geometrical data that has its own coordinate system unique to that scan. In order to align all these parts, all coordinate systems must be aligned with nominal-CAD coordinate system by translational and rotational movements. Eventually all scanned data are in correct relative location. Difference between two coordinate systems in each axis after alignment reveals deviation of alignment between the scanned data and nominal CAD model. By adjusting the coordinate system axes of scanned data with respect to the nominal coordinate axes of the CAD model are shown in FIG. 20.

Figure 15:
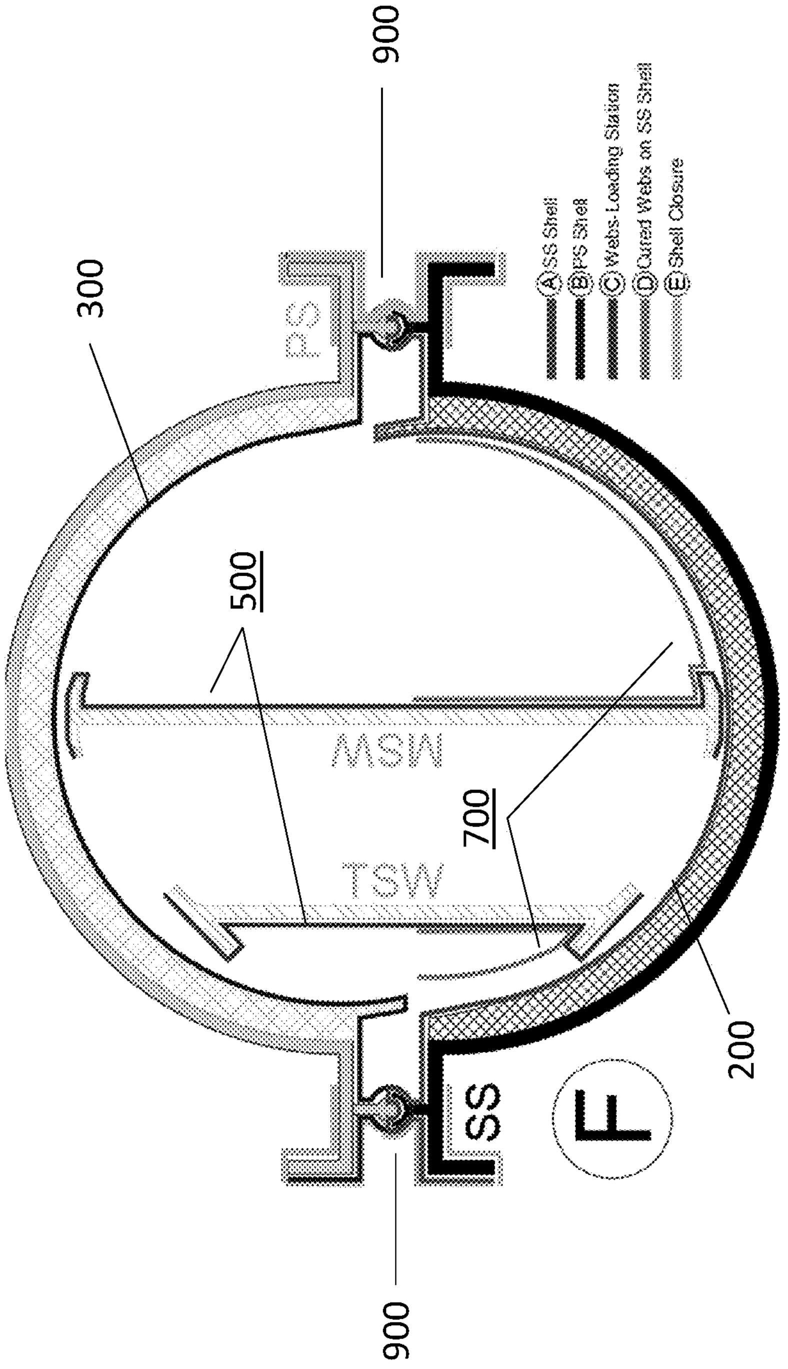
FIG. 15 is a schematic representation of full overlay of scanned data of a blade and mold with shear webs within a scan radius.

In various embodiments, the first, second, third, fourth and fifth scans maybe aligned using common points and/or axes as described above. A visualization 1400 in a 3D CAD environment is shown in FIGS. 14-15 where the B sides of the first and second blade shells are digitally aligned with the MSW 504, 704 and TSW 508, 708 by aligning the closed mold scan 900. The visualization 1400 may be an entire blade from leading edge to trailing edge within a predetermined radius. The predetermined radius may be an input from a user or defined by any scanner described herein. In various embodiments, one or more users or computing programs may include the predetermined radius, such that the entire span of the blade can be visualized in sections.

Figure 16:
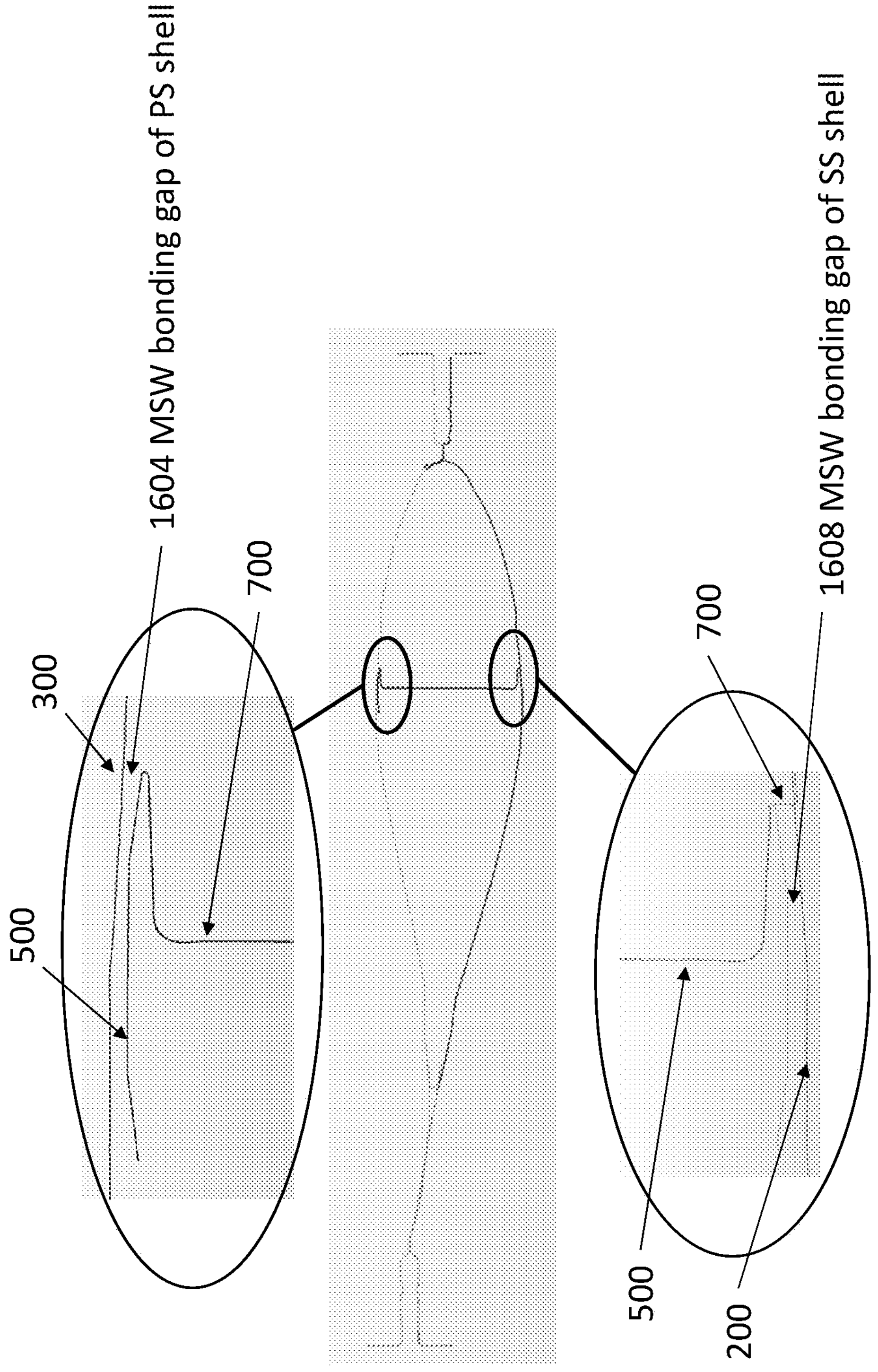
FIG. 16 is a schematic representation of an alignment of scanned data showing bondline gap thicknesses of the main shear web and suction and pressure side shells.

With continued reference to FIG. 1, method 100, at step 145, includes measuring at least one bondline of the aligned scans as shown in FIG. 16. Measuring at least one bondline of the aligned scans may include measuring at least one bondline of the MSW 504 with the pressure side blade shell 304. Measuring the bondline 1604 may include measuring the distance between the scan 500 with the scan 300, as this bondline would be inaccessible in the blade and molds' closed configuration. Measuring the bondline may include measuring the bondline 1604 thickness and width over the entire mating surface, such as the upper flange of the shear web. In various embodiments, the bondline thickness and width corresponds to the amount of bonding paste disposed between the shear web and the blade shell at that point.

In various embodiments, measuring at least one thickness of the aligned scans may include measuring bondline 1608 between the MSW 504 and the suction side blade shell 204. In various embodiments, measuring the bondline 1608 between the MSW and blade shell may include measuring the distance between the scan 500 and the scan 200. Measuring the bondline 1608 may include measuring an average distance between the scanned geometrical data of scan 500 and the scan 200. In various embodiments, measuring the bondline scan 1608 may include measuring the gap between every point of the lower flange of MSW and the suction side blade shell. In various embodiments, measuring the bondline 1608 may include comparing the bondline thickness and width to a threshold thickness and width, such as a customer, military, or commercial specification/requirement.

Figure 17:
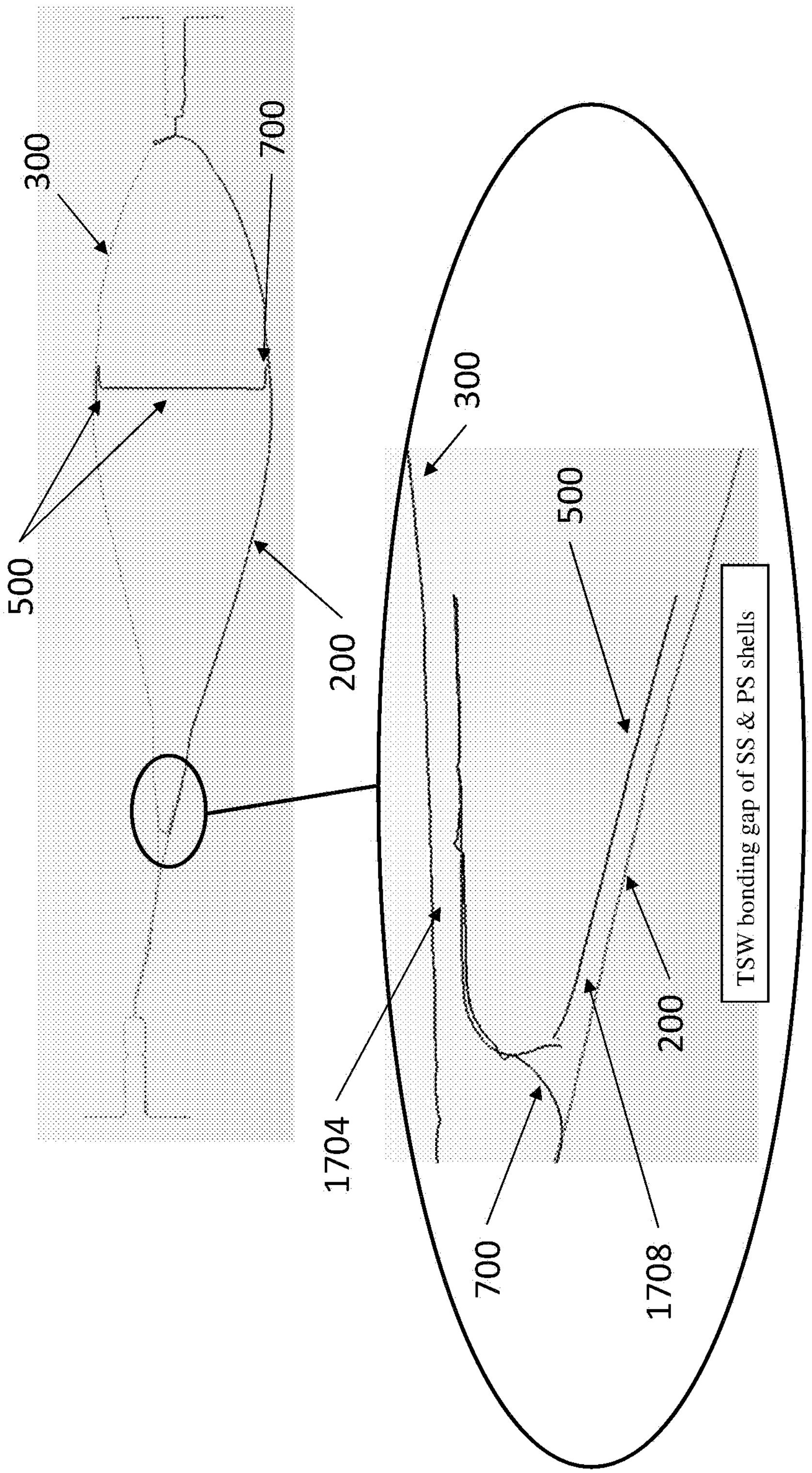
FIG. 17 is a schematic representation of an alignment of scanned data showing bondline gap thicknesses of the trailing shear web and suction and pressure side shells.

In various embodiments, measuring at least one bondline of the aligned scans may include measuring at least one bondline of the TSW 508 with the pressure side blade shell 304 as shown in FIG. 17. Measuring the bondline 1704 may include measuring the distance between the scan 700 of cured TSW 708 with the scan 300 of second blade shell 304, as this bondline would be inaccessible in the blade and molds' closed configuration. Measuring the bondline 1704 may include measuring the bondline 1704 thickness and width over the entire mating surface, such as the upper flange of the trailing shear web 508. In various embodiments, the bondline 1704 thickness and width corresponds to the amount of bonding paste disposed between the shear web and the blade shell at that point.

In various embodiments, measuring at least one thickness of the aligned scans may include measuring bondline 1708 between the TSW 504 and the suction side blade shell 204. In various embodiments, measuring the bondline 1708 between the MSW and blade shell may include measuring the distance between the scan 500 and the scan 200. Measuring the bondline 1708 may include measuring an average distance between the scanned geometrical data of scan 500 and the scan 200. In various embodiments, measuring the bondline scan 1708 may include measuring the gap between every point of the lower flange of MSW and the suction side blade shell. In various embodiments, measuring the bondline 1708 may include comparing the bondline thickness and width to a threshold thickness and width, such as a customer, military, or commercial specification/requirement.

Figure 18:
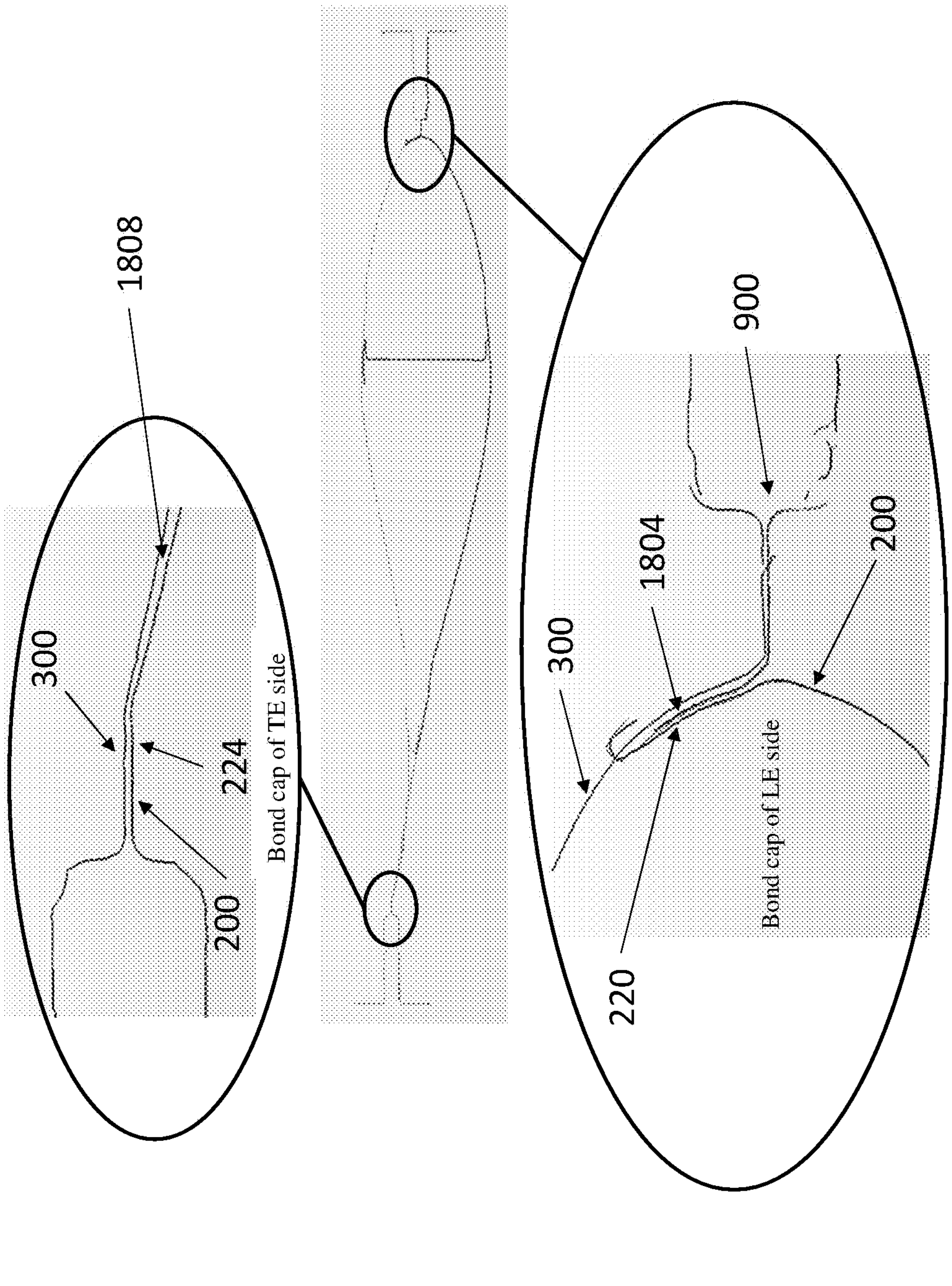
FIG. 18 is a schematic representation of an alignment of scanned data showing bondline gap thicknesses of the trailing and leading edges of the shells and trailing and leading bond caps, respectively.

In various embodiments, measuring at least one bondline of the aligned scans may include measuring bondline 1804. Bondline 1804 may be formed between the leading edge bond cap 220 and the second blade shell 304 (depicted by scan 300 in FIG. 18). In various embodiments, measuring the bondline scan 1804 may include measuring the gap between every point of the LE bond cap 220 and the scan 300. In various embodiments, measuring the bondline 1804 may include comparing the bondline thickness and width to a threshold thickness and width, such as a customer, military, or commercial specification/requirement. In various embodiments, measuring at least one bondline of the aligned scans may include measuring bondline 1808. Bondline 1804 may be formed between the trailing edge bond cap 224 and the second blade shell 304 (depicted by scan 300 in FIG. 18). In various embodiments, measuring the bondline scan 1808 may include measuring the gap between every point of the TE bond cap 224 and the scan 300. In various embodiments, measuring the bondline 1808 may include comparing the bondline thickness and width to a threshold thickness and width, such as a customer, military, or commercial specification/requirement.

Scanning Before and After Adhesive Application

As disclosed herein above, the scanning process method 100 can be performed before and during application of bonding adhesive. Additionally or alternatively, one or more scanning processes can be performed after paste application as well. In various embodiments, all B surfaces can be scanned with the one or more laser scanners such as the C-track device, to generate a link as described above.

In some embodiments, scanning is performed both before and after application of bonding paste. A scanning process method involving scanning before and after adhesive application can be referred to as "Digital Wetcast." In such embodiments, the flanges of the shear webs are used to link (shared/common areas) to measure bondline thickness. The flanges of the shear webs are scanned after application of bonding paste and used to link (shared/common areas) to measure bondline thickness. In such embodiments, where scanning is performed before and after application of bonding paste, B surfaces (adjacent to the shear web flange) are scanned to form a link between B surface and the shear web. An exemplary process of scanning performed before and after paste application is described in Table 1.

TABLE 1

Process steps of scanning both before and after paste application

Figure 10:
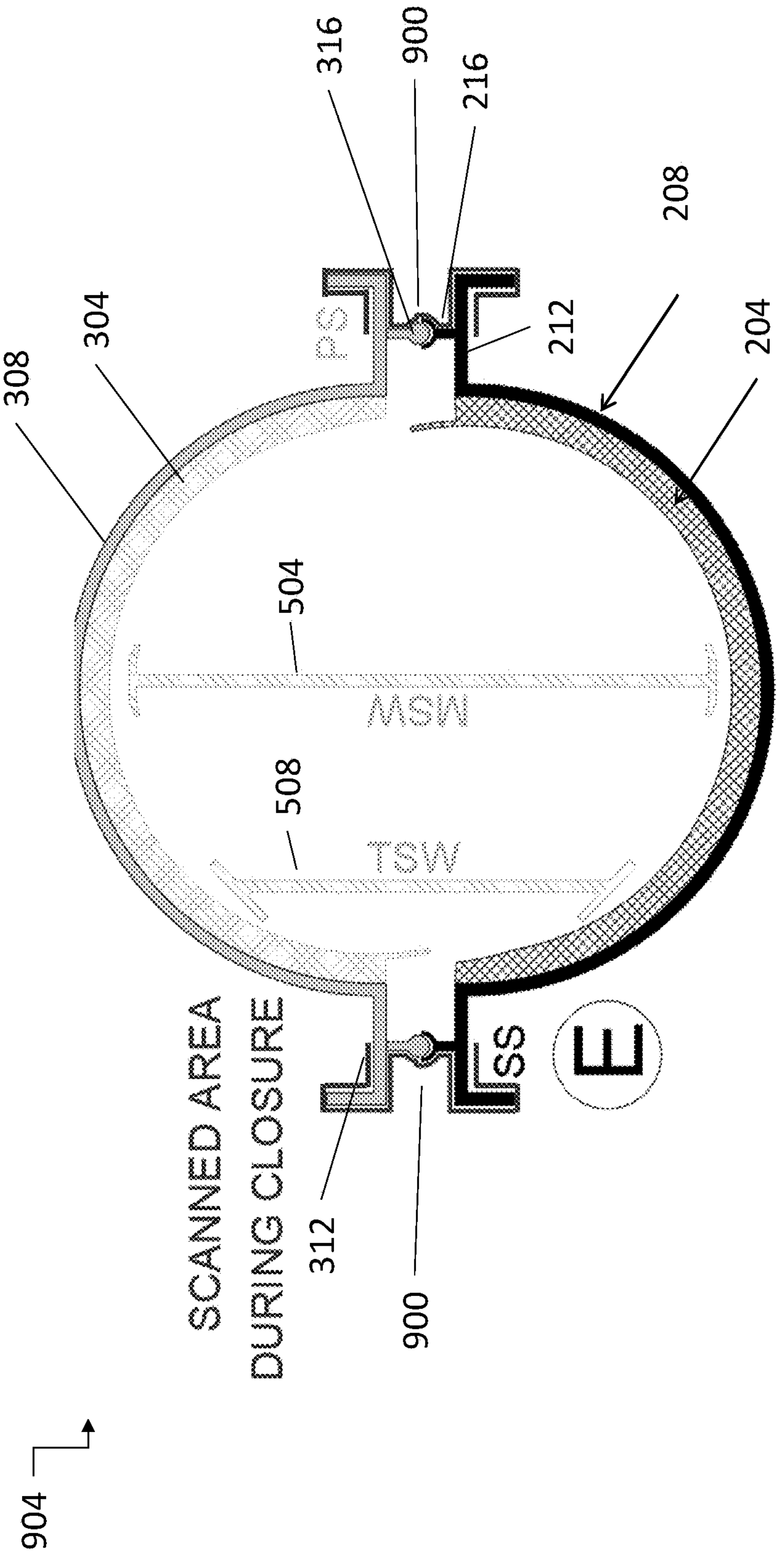
FIG. 10 is a schematic representation of scanned data of mold flanges and knobs during mold closure.
Figure 11:
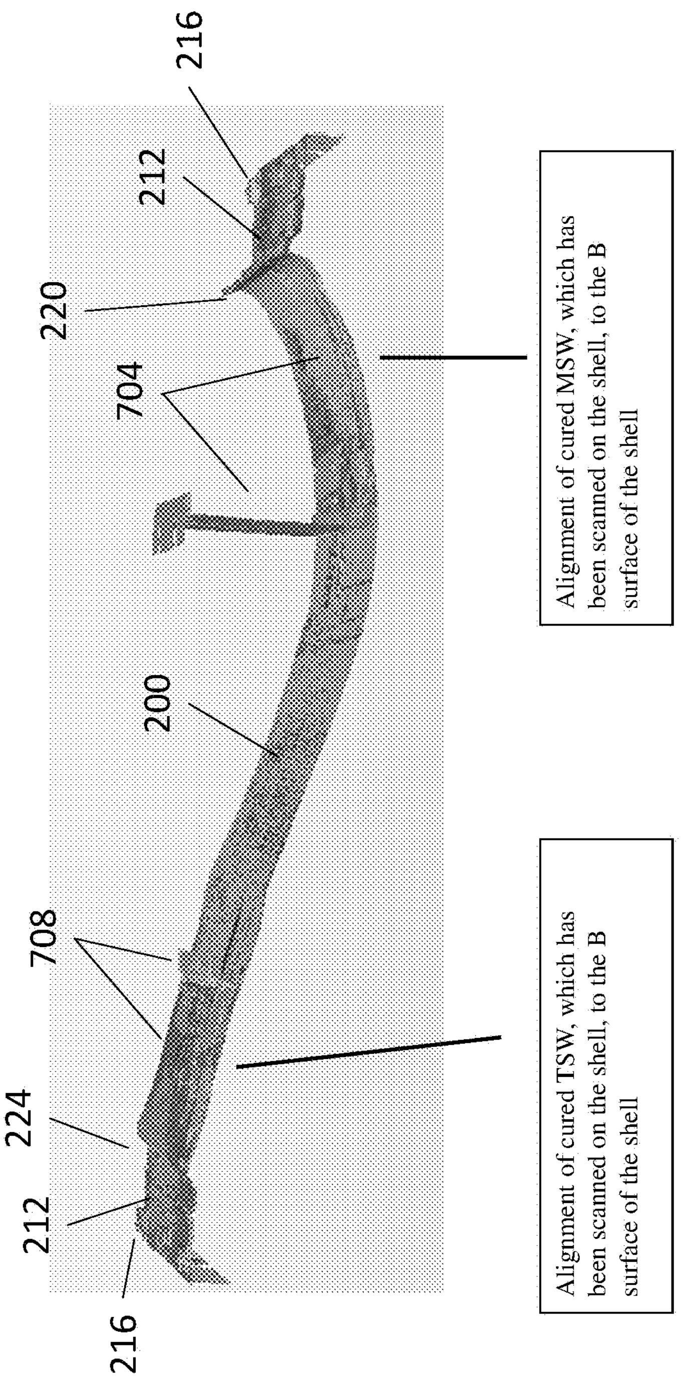
FIG. 11 is a schematic representation of an alignment of scanned data of cured MSW and TSW bonded to suction side shell.

| Scanned part | Station | Illustrated in FIG. |
|---|---|---|
| B surface, bond caps, mold flanges, mold knobs (One time only process) | PS & SS | FIG. 2 |
| Web flanges | Loading station | FIG. 5 |
| Web body and B surface that is proximal to the paste | SS B surface | FIG. 8 |
| After closure, mold flanges, mold knobs (One time only process) | SS & PS (mold closure) | FIG. 10 |

In some embodiments, scanning is only performed before application of bonding paste. A scanning process method involving scanning only before adhesive application can be referred to as "New Generation digital Wetcast." In such embodiments, gantry profiles are used to link (shared/common areas) to measure bondline thickness. The flanges of the shear webs may be optionally scanned after bonding paste application. Gantry profiles are used to form a link between the B surfaces and the shear web flanges. To align the shear web to flanges to the B surface, gantry profiles and web flanges should be scanned together while they are loaded on the load station prior to paste application. Then, the gantry profiles can be scanned as a one-time only process (provided that gantry bolt adjustment or other geometrical changes are not made) once gantry is loaded on SS mold to form a geometric link between the shear web flanges and the B surface. In various embodiments, the one or more link areas can be generated by scanning all related B surfaces in a scanning area or by scanning gantry profiles in the loading station and while on SS mold. This process (scanning the gantry profiles and the web flanges) can be used to link the shear web to the mold via gantry profiles. Scanning the gantry profiles and shear web flanges together may not be a one-time only process due to variations in the relative position between the shear web flanges and the gantry after every loading. The link can be done by scanning the gantry profiles and the shear web flanges together on the loading station and while the gantry is on the mold. An exemplary process of scanning performed before paste application is described in Table 2.

TABLE 2

Process steps of scanning only before paste application

Figure 22A:
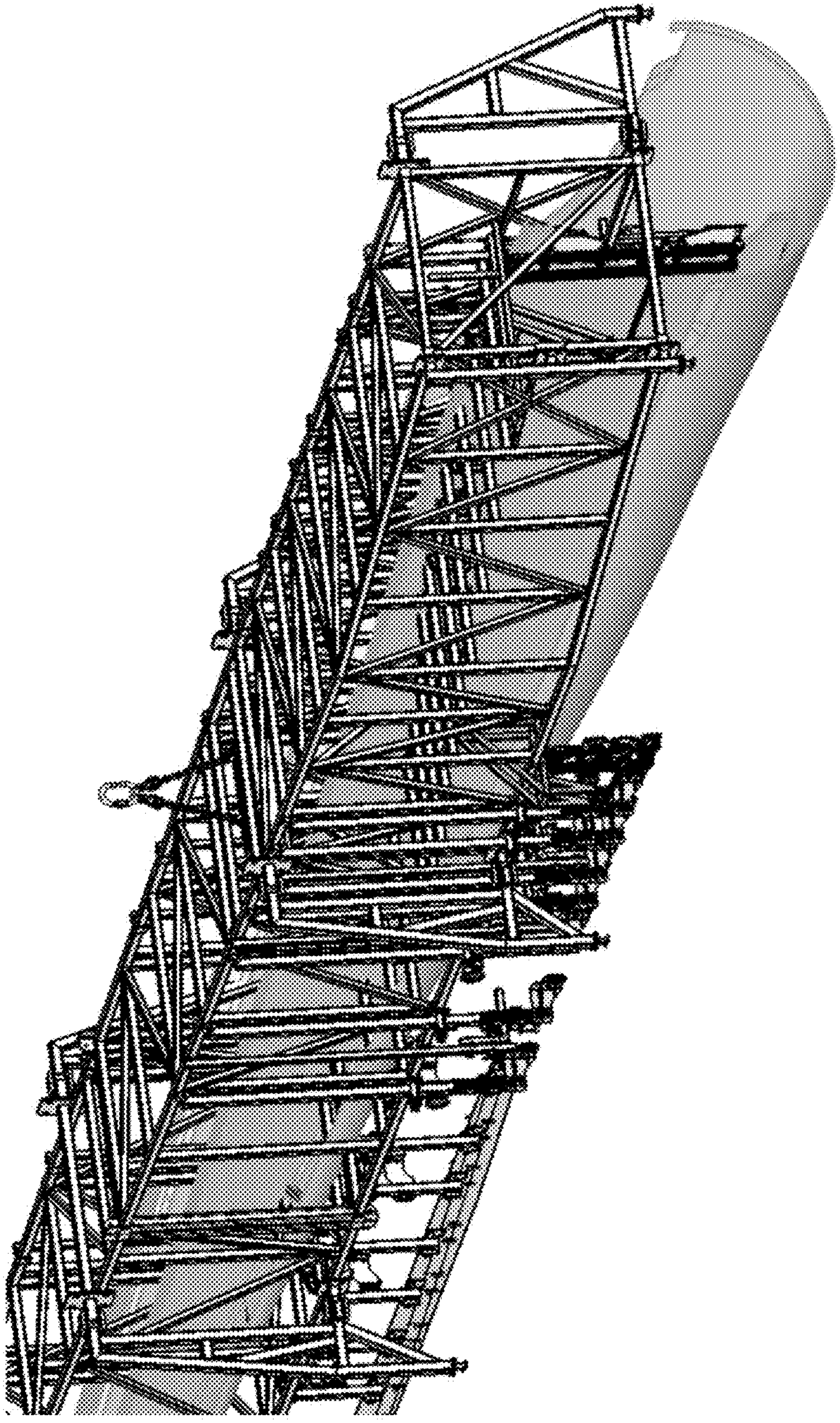
FIG. 22A is a view of a gantry loaded on a mold according to various embodiments of the present disclosure.
Figure 22B:
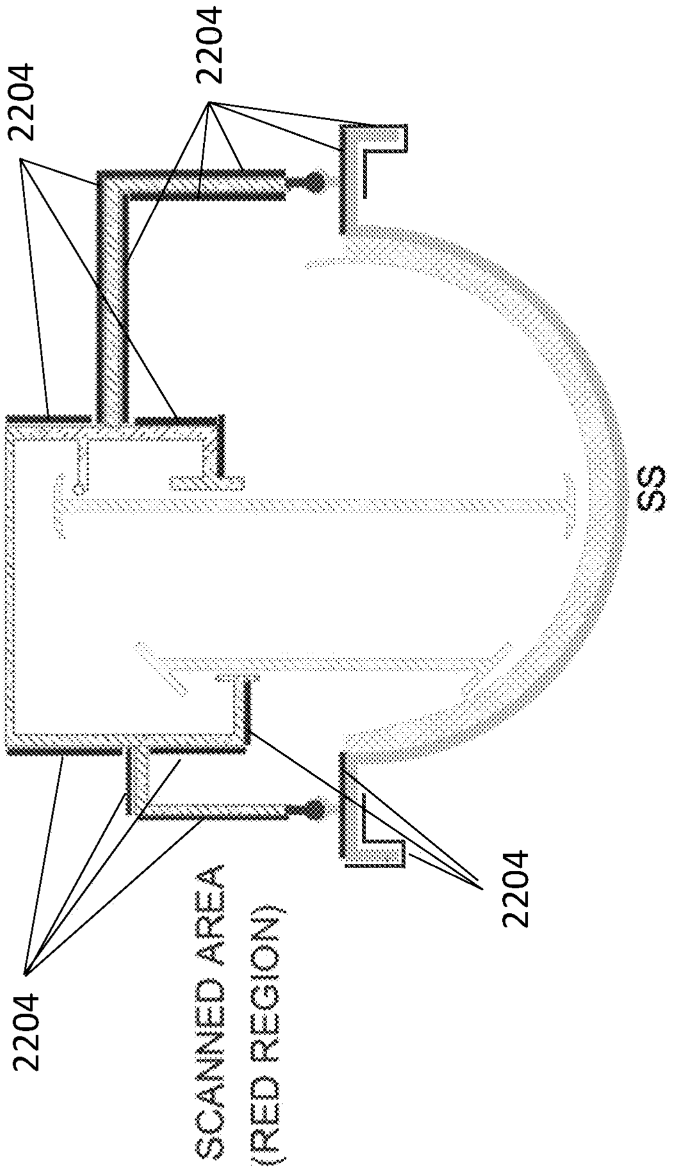
FIG. 22B is a schematic representation of scanned data of a gantry profile and mold flanges and knobs according to various embodiments of the present disclosure.
Figure 23:
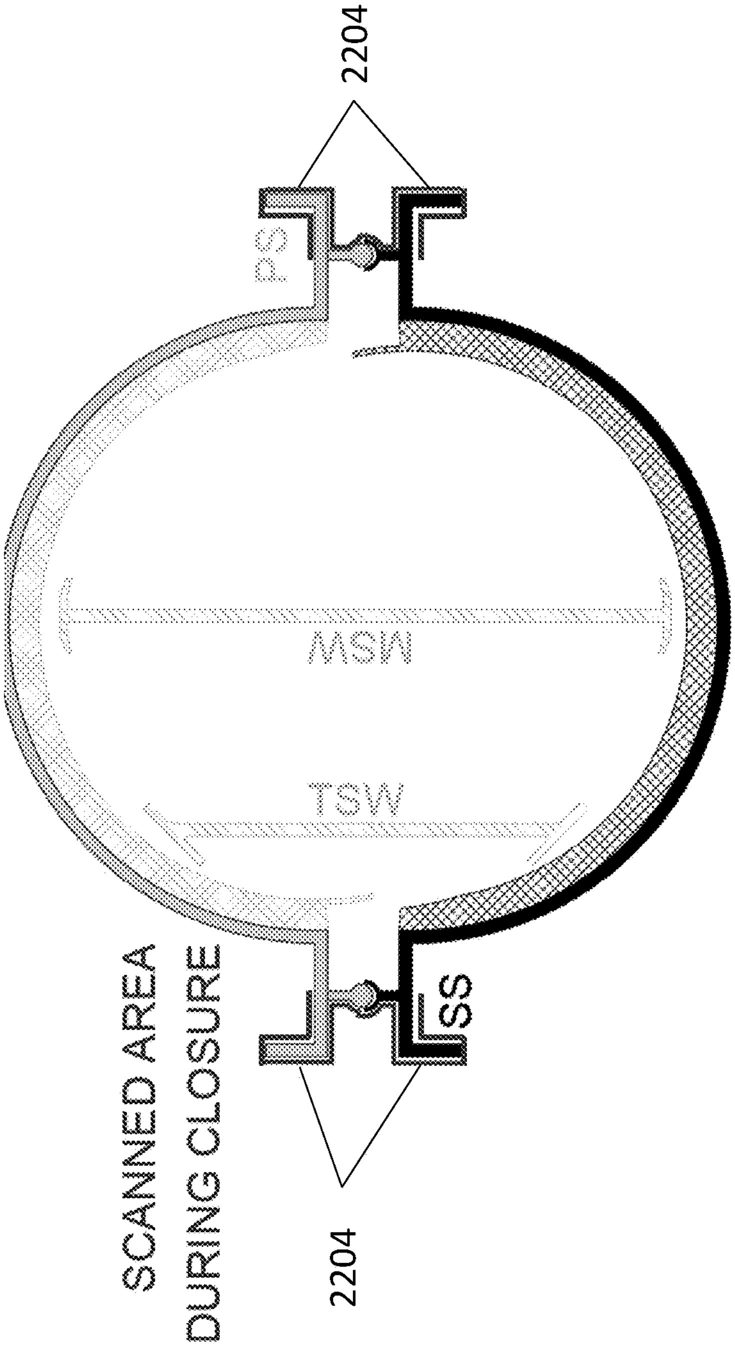
FIG. 23 is a schematic representation of scanned data of mold flanges and knobs during mold closure according to various embodiments of the present disclosure.
Figure 24A:
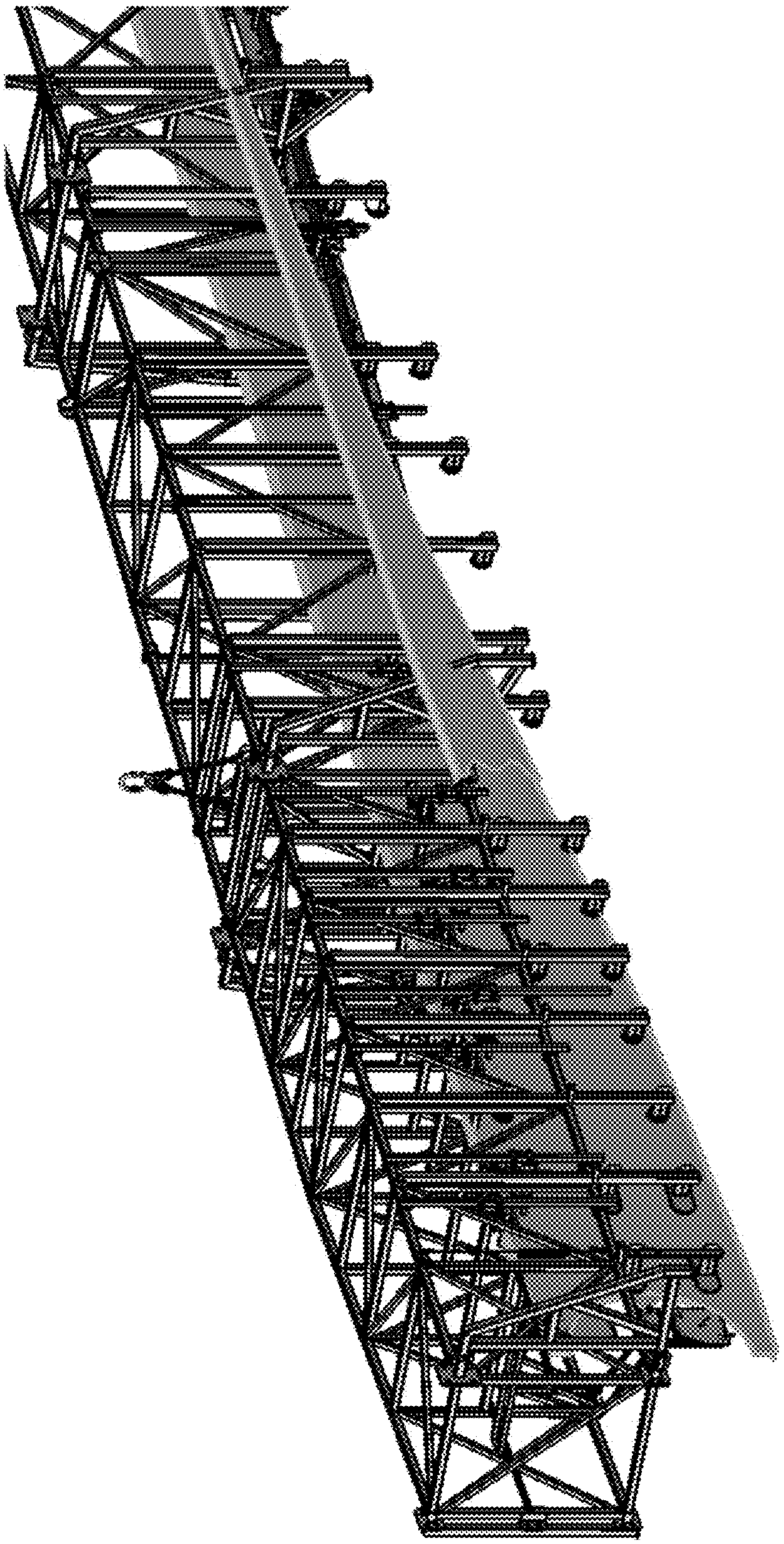
FIG. 24A is a view of a gantry in the loading station according to various embodiments of the present disclosure.
Figure 24B:
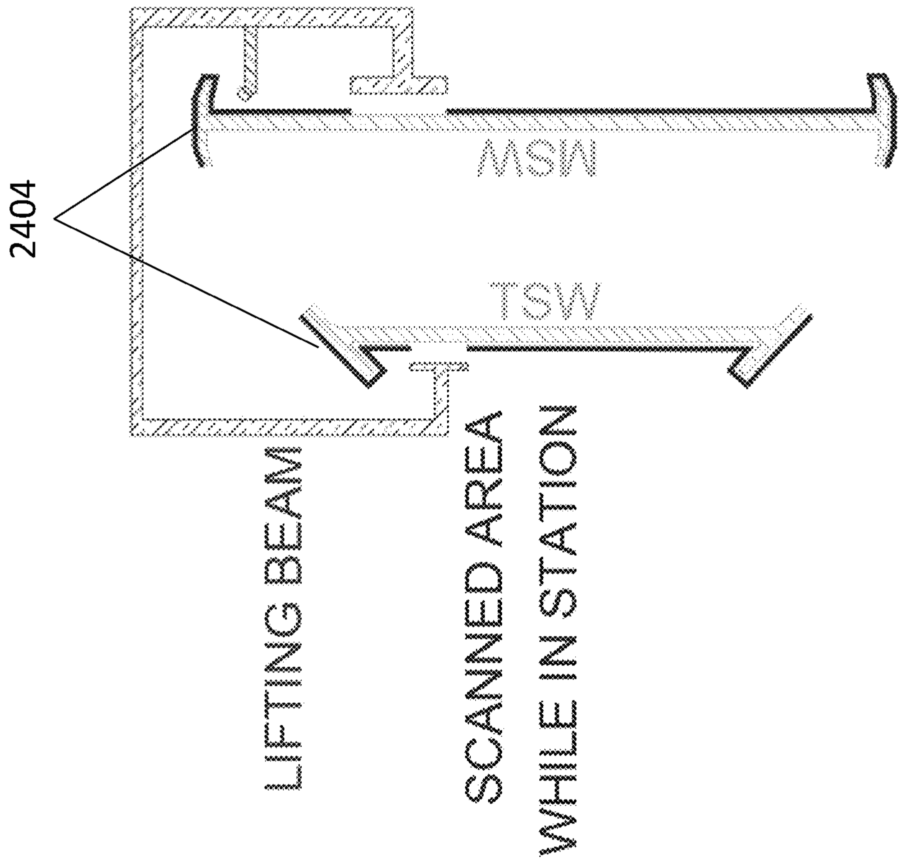
FIG. 24B is a schematic representation of scanned data of the MSW, TSW, and gantry profile according to various embodiments of the present disclosure.
Figure 25:
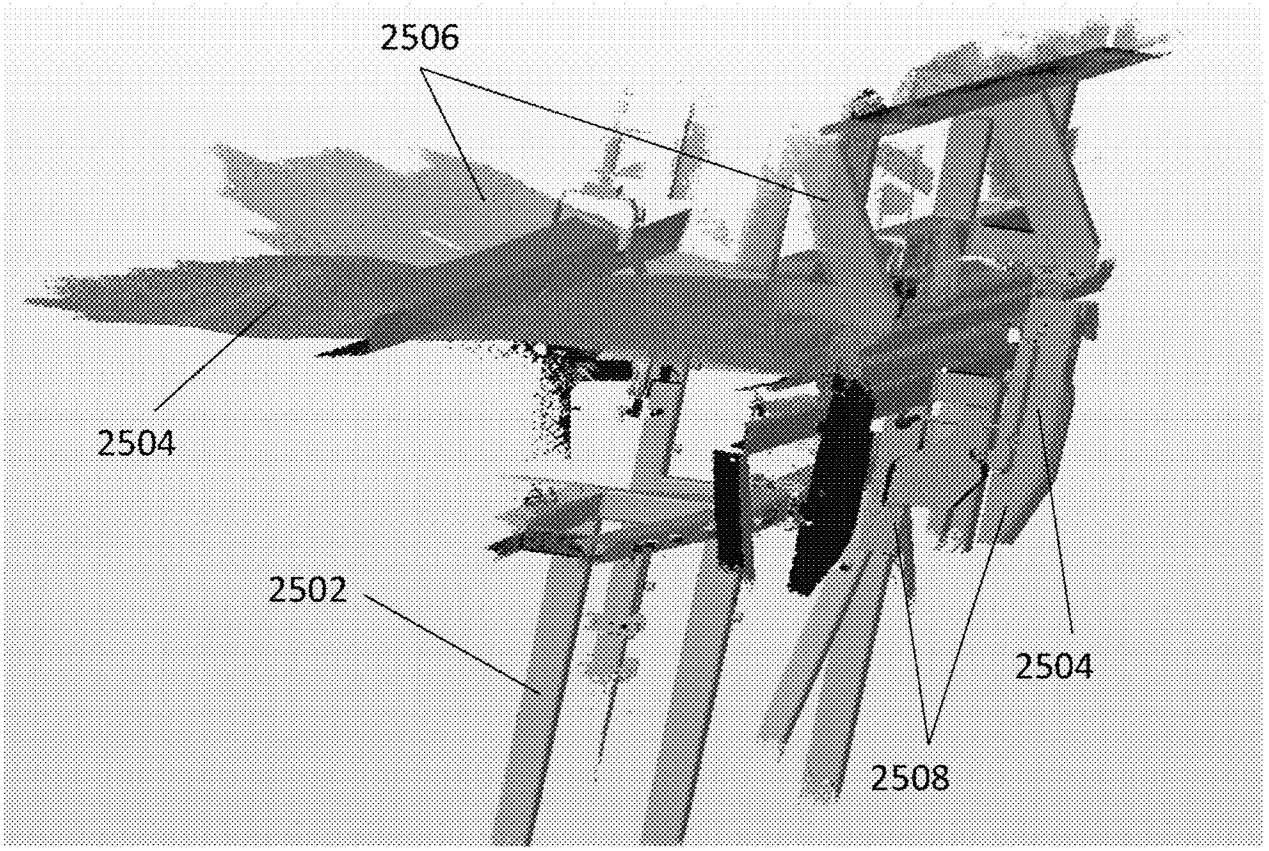
FIG. 25 is a schematic representation of full overlay of scanned data according to various embodiments of the present disclosure.
Figure 26:
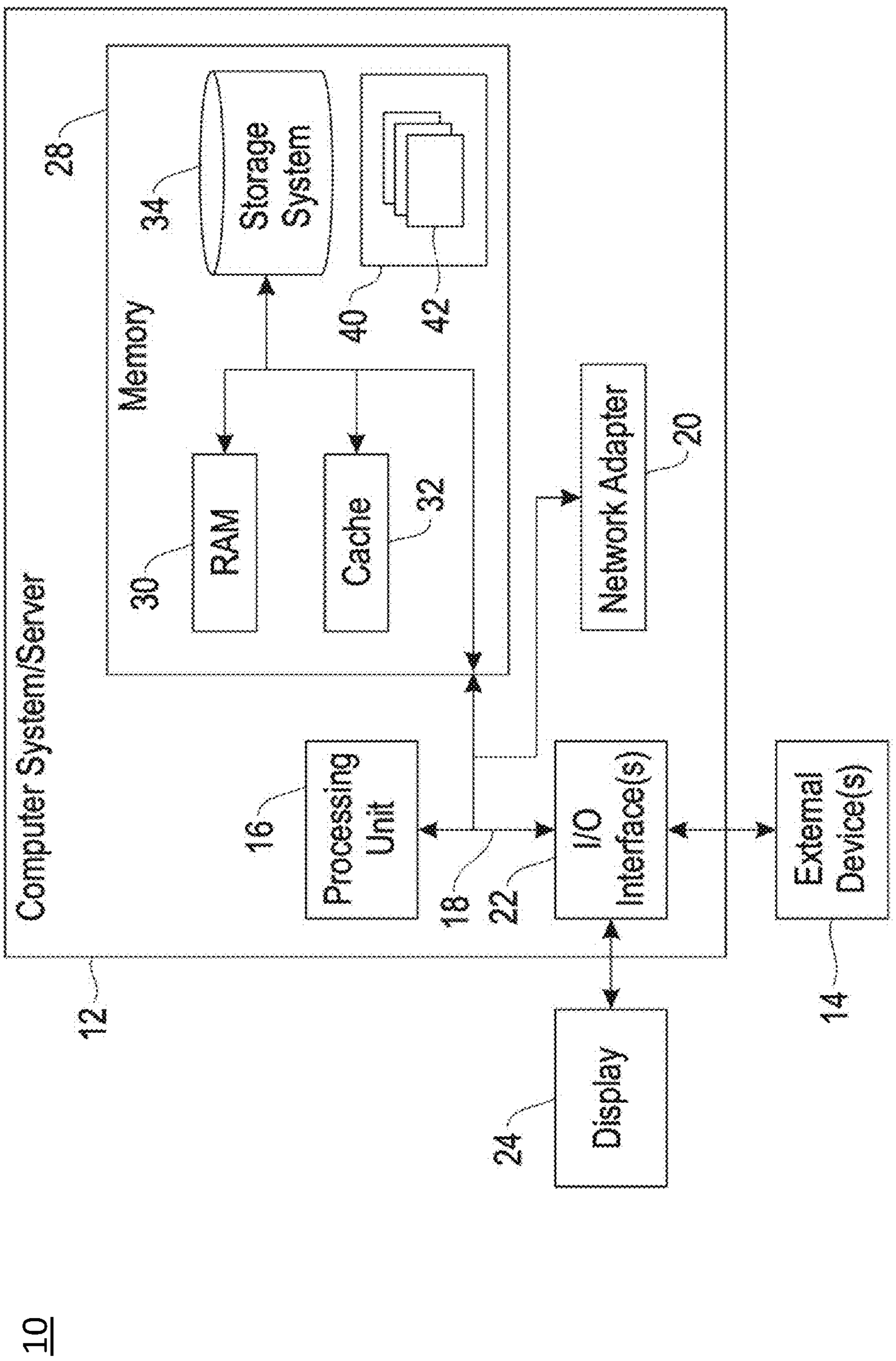
FIG. 26 depicts a computing node according to various embodiments of the present disclosure.

| Scanned part | Station | Illustrated in FIG. |
|---|---|---|
| B surface, bond caps, mold flanges, mold knobs (One time only process) | PS & SS | FIG. 22A-22B |
| After closure, mold flanges, mold knobs (One time only process) | SS & PS (mold closure) | FIG. 23 |
| Gantry and mold → mold flanges, mold knobsgantry profiles (One time only process) | Mold | FIG. 24A-24B |
| Gantry and web → web bottom flange, web top flange, gantry profiles | Loading station | FIG. 25 |

Figure 21:
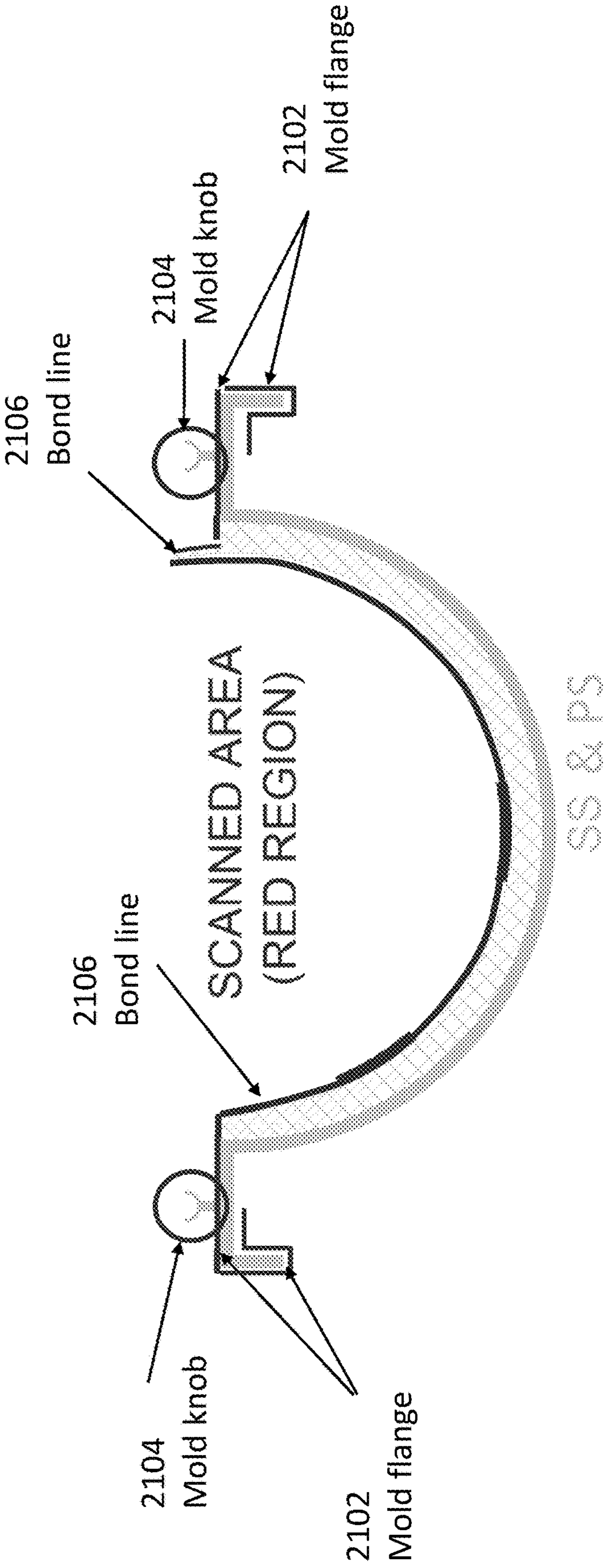
FIG. 21 is a schematic representation of scanned data of B surface of a pressure side shell and a suction side shell with mold flanges and knobs according to various embodiments of the present disclosure.

The gantry's related profiles, which may not include every profile, such as only the profiles which are close to web flanges, can be scanned while gantry is loaded on loading station. As shown in FIG. 21, the B surfaces, bond lines 2106 thereof, mold flanges 2102 and knobs 2106 may be scanned while in an open configuration, the B surfaces, bond lines 2106, mold flanges 2102, and knobs 2104 can be scanned one or more instances.

In various embodiments, the gantry profiles and mold flanges 2204 can be scanned together while gantry is loaded on SS mold as shown in FIGS. 22A-22B. These scanned models can be used to link the shared common areas between web flanges and B surface where paste application is performed. In various embodiments, the mold flanges 2204 can then be scanned after mold closure to link the shared common areas of the PS mold and the SS mold as shown in FIG. 23. These scanned models are used to link the shared common areas between SS and PS mold assembly.

In various embodiments, top and bottom surfaces of web flanges 2404, and gantry related profiles that have been scanned before adhesive paste application are scanned together in the loading station as shown in FIGS. 24A-24B. The scanned models of web flanges can be positioned with SS side B surface where paste application is aligned by utilizing the link of the shared common areas gantry profiles that have been scanned. Thus, positioning of web flanges are carried out to SS B surface, and finally paste thickness can be measured before traditional wetcast operation is done. The 3D data generated by the laser scanner used for scanning may be transmitted to a computing environment such as the 3D CAD environment (an example of a 3D visualization is shown in FIG. 25).

In various embodiments, gantry profiles may be scanned either when the gantry is on the loading station/beam or it is loaded on a mold such as the SS mold (with or without webs) are used to link the shared common areas to measure paste thickness. In various embodiments, the web flanges may not require scanning after paste application. Both methods eliminate the adhesive paste application, which can be carried out between vacuum bags (before traditional wetcast operation application), to verify whether there is clash between the molds in advance. These methods and systems may eliminate time waste caused by crane movement. In various embodiments, processes for these two methods are scanning of mold flanges for SS and PS molds assembly. One-time processes can be used to create template models to align webs' flanges to the right position into the shells to measure paste thickness provided that gantry and mold bolt adjustment are not done.

As shown in FIG. 29, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be signals, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A method for measuring bondline thickness of a wind turbine blade, the method comprising:

providing a three dimensional laser scanning device;

providing a first mold half, the first mold half defining a pressure side of the wind turbine blade;

providing a second mold half, the second mold half defining a suction side of the wind turbine blade;

scanning a first blade shell in the first mold half, the first mold half having a mold flange and a mold knob, forming a first scan;

scanning a second blade shell in the second mold half, the second mold half having a mold flange and a mold knob, forming a second scan;

scanning the at least one shear web exterior to the mold, forming a third scan;

bonding the at least one shear web to the first blade shell;

scanning the bonded at least one shear web and the first blade shell, forming a fourth scan;

closing the first mold half onto the second mold half to form a closed mold;

scanning the mold flanges and the mold knobs of the closed mold, forming a fifth scan;

aligning the first, second, third, fourth and fifth scans; and measuring at least one bondline of the aligned scans.

2. The method of claim 1, wherein the bondline is formed between the at least one shear web and the second blade shell.

3. The method of claim 1, wherein the bondline is formed between the first blade shell, the second blade shell, and a leading edge bond cap.

4. The method of claim 1, wherein the bondline is formed between the first blade shell, the second blade shell, and a trailing edge bond cap.

5. The method of claim 1, wherein scanning the at least one shear web exterior to the mold comprises scanning a main body, a first flange and a second flange of the at least one shear web.

6. The method of claim 1, further comprising uniformly placing at least one retroreflective target on at least one of the first blade shell and the second blade shell;

scanning the at least one retroreflective target; and locating the at least one retroreflective target in a computer environment.

7. The method of claim 1, wherein aligning the scans comprises selecting at least one point shared between the scans and minimizing the deviation between the at least one point between the scans.

8. The method of claim 1, wherein aligning the scans comprises adjusting an axis of a scan relative to a global axis of the computer environment.

9. The method of claim 1, wherein aligning the scans comprises aligning the scan of the at least one shear web with the scan of the bonded at least one shear web and the first blade shell.

10. The method of claim 1, wherein aligning the scans comprises aligning the scan of the first blade shell and the second blade shell by contacting the corresponding mold knobs and mold flanges.

11. The method of claim 1, wherein the at least one shear web comprises a main shear web and a trailing shear web.

12. The method of claim 1, wherein forming the first, second, third, fourth and fifth scan comprises transmitting scanned data to a three-dimensional (3D) computer environment.

* * * * *